US012377392B2

(12) United States Patent
Ballew et al.

(10) Patent No.: US 12,377,392 B2
(45) Date of Patent: Aug. 5, 2025

(54) LOW VOLUME MAGNETIC MIXING SYSTEM

(71) Applicant: SANISURE, INC., Camarillo, CA (US)

(72) Inventors: Chris Ballew, Thousand Oaks, CA (US); Richard Shor, Moorpark, CA (US); Matthew Markey, Newbury Park, CA (US); Joshua Rosen, Camarillo, CA (US)

(73) Assignee: SaniSure, Inc., Camarillo, CA (US)

(*) Notice: Subject to any disclaimer, the term of this patent is extended or adjusted under 35 U.S.C. 154(b) by 50 days.

(21) Appl. No.: 18/604,984

(22) Filed: Mar. 14, 2024

(65) Prior Publication Data

US 2024/0252999 A1 Aug. 1, 2024

Related U.S. Application Data

(63) Continuation of application No. 18/483,355, filed on Oct. 9, 2023, now Pat. No. 11,958,026, which is a continuation-in-part of application No. PCT/US2022/043700, filed on Sep. 15, 2022.

(60) Provisional application No. 63/244,704, filed on Sep. 15, 2021.

(51) Int. Cl.
*B01F 33/00* (2022.01)
*B01F 33/453* (2022.01)
*B01F 35/50* (2022.01)

(52) U.S. Cl.
CPC .......... *B01F 33/4532* (2022.01); *B01F 35/50* (2022.01)

(58) Field of Classification Search
CPC ............................ B01F 35/4532; B01F 35/50
See application file for complete search history.

(56) References Cited

U.S. PATENT DOCUMENTS

| | | | |
|---|---|---|---|
| 1,420,774 | A | 6/1922 | Stainbrook |
| 2,655,354 | A | 10/1953 | Murray |
| 3,279,765 | A | 10/1966 | Sato et al. |
| 4,209,259 | A | 6/1980 | Rains et al. |
| 4,611,790 | A | 9/1986 | Otsuka et al. |
| 4,993,841 | A | 2/1991 | Lofgren et al. |

(Continued)

FOREIGN PATENT DOCUMENTS

CN 108435051 A 8/2018

OTHER PUBLICATIONS

World Intellectual Property Organization, International Search Report and Written Opinion for International Application No. PCT/US2022/043700, mail date Dec. 23, 2022, 21 total pages.

*Primary Examiner* — Anshu Bhatia
(74) *Attorney, Agent, or Firm* — SoCal IP Law Group LLP; Steven C. Sereboff; Guy L. Cumberbatch

(57) ABSTRACT

A mixing system for use in a process bottle for mixing its contents, the mixing system including a low volume magnetically-driven mixer mounted at the bottom of the bottle. The mixer may have vanes and lower grooves, or no vanes and grooves on both upper and lower faces. The mixer has a "microsized" three-dimensional solid inanimate body to enable insertion through relatively small mouth openings at the top of conventional reactor bottles. Methods of assembly are also disclosed which involve passing the microsized mixer through an open mouth of a process bottle and coupling the mixer with a bearing assembly at the floor of the bottle. The bearing assembly includes fixtures sealed around a hole in the floor of the bottle.

26 Claims, 30 Drawing Sheets

(56) References Cited

U.S. PATENT DOCUMENTS

| | | | |
|---|---|---|---|
| 5,061,079 | A | 10/1991 | Shiobara |
| 5,141,327 | A | 8/1992 | Shiobara |
| 5,393,142 | A | 2/1995 | Meier |
| 5,407,272 | A | 4/1995 | Meier |
| 5,527,381 | A | 6/1996 | Waite et al. |
| 5,758,965 | A | 6/1998 | Gambrill et al. |
| 6,056,803 | A | 5/2000 | Waite |
| 6,065,865 | A | 5/2000 | Eyraud et al. |
| 6,206,562 | B1 | 3/2001 | Eyraud et al. |
| 6,464,387 | B1 | 10/2002 | Stogsdill |
| 6,663,276 | B2 | 12/2003 | Yale |
| 6,854,877 | B2 | 2/2005 | Hoobyar et al. |
| 6,857,774 | B2 | 2/2005 | Kozyuk |
| 7,396,153 | B2 | 7/2008 | Anderson |
| 7,481,572 | B2 | 1/2009 | Terentiev |
| 7,503,745 | B2 | 3/2009 | Whitehouse et al. |
| 7,629,167 | B2 | 12/2009 | Hodge et al. |
| 7,645,067 | B2 | 1/2010 | Uesugi et al. |
| 7,748,893 | B2 | 7/2010 | Yaniv et al. |
| 7,762,716 | B2 | 7/2010 | Terentiev et al. |
| 7,815,362 | B2 | 10/2010 | Myhrberg et al. |
| 7,980,531 | B2 | 7/2011 | Myhrberg et al. |
| 8,128,277 | B2 | 3/2012 | Meier |
| 8,167,480 | B2 | 5/2012 | Myhrberg et al. |
| 8,178,036 | B2 | 5/2012 | Neff et al. |
| 8,182,137 | B2 | 5/2012 | Terentiev |
| 8,282,269 | B2 | 10/2012 | Terentiev |
| 8,460,615 | B2 | 6/2013 | Persson et al. |
| 8,524,146 | B2 | 9/2013 | Cooper |
| 8,534,907 | B2 | 9/2013 | Yum |
| 8,535,603 | B2 | 9/2013 | Cooper |
| 8,741,631 | B2 | 6/2014 | Le et al. |
| 8,783,942 | B2 | 7/2014 | Johansson |
| 8,808,636 | B2 | 8/2014 | Persson et al. |
| 9,108,170 | B2 | 8/2015 | Wang et al. |
| 9,221,024 | B2 | 12/2015 | Terentiev |
| 9,328,615 | B2 | 5/2016 | Cooper |
| 9,333,479 | B2 | 5/2016 | Persson et al. |
| 9,381,478 | B2 | 7/2016 | Firestone |
| 9,382,599 | B2 | 7/2016 | Cooper |
| 9,506,129 | B2 | 11/2016 | Cooper |
| 9,550,157 | B2 | 1/2017 | Erdenberger et al. |
| 9,657,578 | B2 | 5/2017 | Cooper |
| 9,669,368 | B2 | 6/2017 | Johansson |
| 9,744,507 | B2 | 8/2017 | Morrissey et al. |
| 9,815,035 | B2 | 11/2017 | Werth et al. |
| 9,833,757 | B2 | 12/2017 | Johansson |
| 10,029,221 | B2 | 7/2018 | Shima et al. |
| 10,357,748 | B2 | 7/2019 | Rozy et al. |
| 10,471,401 | B2 | 11/2019 | Werth et al. |
| 10,570,745 | B2 | 2/2020 | Cooper |
| 10,610,839 | B2 | 4/2020 | Morrissey et al. |
| 10,653,878 | B2 | 5/2020 | Lofving et al. |
| 11,084,007 | B2 | 8/2021 | Adams |
| 11,117,107 | B2 | 9/2021 | Bashellier |
| 11,464,086 | B2 | 10/2022 | Lautenschlager et al. |
| 11,629,322 | B2 | 4/2023 | Prabhudharwadkar et al. |
| 2005/0087002 | A1 | 4/2005 | Kanzaki et al. |
| 2005/0141342 | A1 | 6/2005 | Hoobyar et al. |
| 2007/0036027 | A1 | 2/2007 | Meier |
| 2007/0076995 | A1 * | 4/2007 | Engel .................. B01F 33/4532 384/492 |
| 2007/0189115 | A1 | 8/2007 | Yaniv et al. |
| 2010/0046323 | A1 | 2/2010 | Tien et al. |
| 2010/0309746 | A1 | 12/2010 | Andersson |
| 2013/0081545 | A1 * | 4/2013 | Thai .................... A47J 43/0716 99/466 |
| 2014/0071788 | A1 | 3/2014 | Wang et al. |
| 2014/0334249 | A1 | 11/2014 | Radow |
| 2016/0114300 | A1 | 4/2016 | Pagliaro et al. |
| 2016/0175789 | A1 | 6/2016 | Shima et al. |
| 2017/0176106 | A1 | 6/2017 | Cooper |
| 2017/0216787 | A1 | 8/2017 | Werth |
| 2018/0140128 | A1 | 5/2018 | Kodama et al. |
| 2020/0146509 | A1 | 5/2020 | Rai |
| 2023/0001366 | A1 | 1/2023 | Jung |

* cited by examiner

LOW VOLUME MAGNETIC MIXING SYSTEM

RELATED APPLICATION INFORMATION

This application is a continuation of U.S. patent application Ser. No. 18/483,355, filed Oct. 9, 2023, which is a continuation-in-part of International Patent Application No. PCT/US22/43700, filed Sep. 15, 2022, which claims the benefit of priority to Provisional Application No. 63/244,704, filed Sep. 15, 2021, all entitled "LOW VOLUME MAGNETIC MIXING SYSTEM," which are incorporated herein by reference in their entireties.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

The present invention relates to a mixing system, and in particular to a magnetic mixing system with either winged or vaned or puck or disk low shear mixers or impellers.

Description of the Related Art

In the preparation of liquid components for biotech and pharmaceutical processing, it is important to perform mixing within a closed environment. Some applications of a magnetic stirrer may be in an aseptic vessel for cell culturing.

Long ago, i.e., at least as early as 1917, a magnetic stirrer was proposed by Stringham in U.S. Pat. No. 1,242,493, and later in 1942 improved by Rosinger in U.S. Pat. No. 2,350,534. The stirring element consisted of a rod-shaped magnet inside and a neutral shell or covering around it. The stirring rod was simply dropped in the vessel, and allowed to sit on the bottom of the vessel to be rotated by an external rotating electro-magnet. Often, the particulars of modern bioreactor processes such as cell culturing require specific mixing capabilities, such as low shear, high torque, etc., which preclude the use of simple stir rods or bars.

The present mixing system may be useful in many ways, such as in aseptic process vessels for cell culturing, buffer prep, powder blending, vaccine blending with Aluminum phosphate ($AlPO_4$) or other applications.

SUMMARY OF THE INVENTION

The application discloses a mixing system typically for use in a vessel for mixing its contents, the mixing system including a low shear magnetically-driven mixer mounted at the bottom of a process vessel. The mixer may have vanes and lower grooves, or no vanes and grooves on both upper and lower faces.

One embodiment described herein is an aseptic mixing system for an aseptic process vessel having a volume and an upper mouth with an upper mouth diameter. The mixing system includes a solid inanimate mixer mounted for rotation about a central axis at the bottom of the process vessel. The mixer is generally circular in plan view with a disk-shaped body in which is mounted at least one magnet to enable coupling with a magnetic-drive exterior to the process vessel. The mixer may have at least one vertical plane of symmetry through the central axis. The mixer has an overall outer diameter relative to the central axis that is less than the upper mouth diameter of the process vessel to enable passage therethrough, and a plurality of lower grooves formed in a lower face of the disk-shaped body.

The aseptic mixing may also have a plurality of evenly circumferentially-spaced vanes upstanding from the disk-shaped body. The vanes may extend radially outward from the disk-shaped body. There may be four of the vanes, and four of the lower grooves evenly circumferentially-spaced about the central axis, with the four lower grooves offset circumferentially from the four vanes.

The mixer may have no vanes upstanding from the disk-shaped body so as to be puck-shaped. The puck-shaped mixer may also have a plurality of upper grooves formed in an upper face of the disk-shaped body. There may be six of the lower grooves evenly circumferentially-spaced about the central axis. The six lower grooves may be offset circumferentially from six of the upper grooves evenly circumferentially-spaced about the central axis.

The aseptic mixing system may further include a bearing assembly mounted through a hole in a floor of the process vessel configured to support the mixer for rotation about the central axis. The bearing assembly may have a bearing member adapted to seal on the floor of the process vessel around the hole, and which defines a central through hole, and a lower holding nut having an upstanding internally-threaded vertical column sized to pass through the central through hole has a lower flange arranged to be adhered to an underside of the floor of the process vessel, the bearing assembly further having a screw sized to pass down through a central throughbore in the disk-shaped body and engage the internally-threaded vertical column to secure the mixer above the floor while permitting rotation thereof. The bearing member may have a base flange that defines a downwardly-facing groove, and the bearing assembly includes an O-ring positioned in the groove that seals against the floor of the process vessel around the hole.

The aseptic mixing system preferably has two magnets mounted within the disk-shaped body to enable coupling with a magnetic-drive exterior to the process vessel, and the magnets are positioned within two diametrically-opposed cavities open to an underside of the disk-shaped body. The two diametrically-opposed cavities may be offset circumferentially from the lower grooves.

DETAILED DESCRIPTION

Description in Connection with Figures

Figure 1:
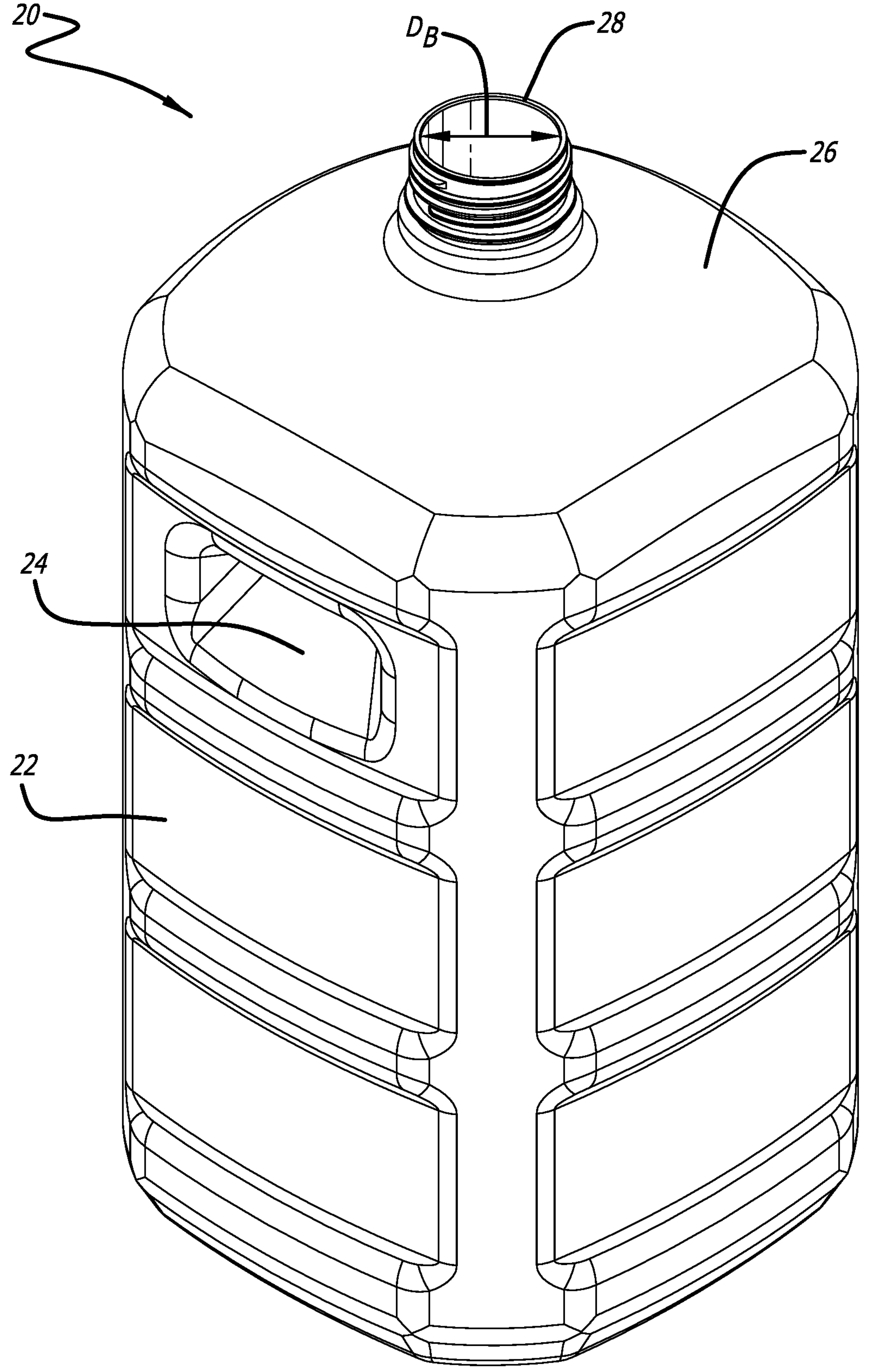
FIG. 1 is a perspective view of an exemplary bottle forming part of a mixing system as described herein.

FIG. 1 is a perspective view of an exemplary flask or bottle 20 forming part of a mixing system as described herein. The bottle 20 includes vertical sidewalls 22 which may be reinforced with ribs or other stiffening features as shown, and may incorporate indents 24 on opposite sides that function as handles. A top wall 26 leads to an upper opening 28, to which a cap (not shown) may be fastened for sealing the contents of the bottle. In some processes, the cap may include ports and tubes that extend downward for introducing or removing fluid from within the interior of the bottle 20, such as described in U.S. Pat. No. 10,260,036 to Shor, et al., the contents of which are hereby expressly incorporated by reference. Alternatively, the ports and tubes may be passed through holes formed in the sidewalls 22 or top wall 26. The upper opening 28 defines an inner diameter DB that varies depending on bottle size. The bottle 20 is supplied by various manufacturers as an aseptic process vessel for cell culturing, buffer prep, powder blending, vaccine blending with Aluminum phosphate ($AlPO_4$) or other applications.

The bottle 20 may be provided in volumes between 500 ml to 50 liters and made of PET or Polycarbonate. If formed of Polycarbonate, which is preferred in many instances for its inert properties, seals for access holes in the bottle are provided. It should be understood that though a bottle 20 is shown, other vessels may be used, and the term process vessel encompasses bottles, flasks, buckets, etc. of different sizes and shapes that hold fluid and are suitable for the particular process. When using a bottle 20, the inner diameter DB of the upper opening 28 varies for different sizes of bottles, becoming larger for larger bottles. One common bottle supplied for processing uses has three upper opening 28 diameters DB for three size classes. Smaller bottles of between 500 ml to 2 liters have an opening diameter DB of 48 mm, medium sized bottles of greater than 2 liters but less than 50 liters have an opening diameter DR of 70 mm, and large 50 liter bottles have an opening diameter DR of 150 mm. Of course, this ratio of upper opening 28 diameter DB to bottle size may vary depending on manufacturer.

Figure 2A:
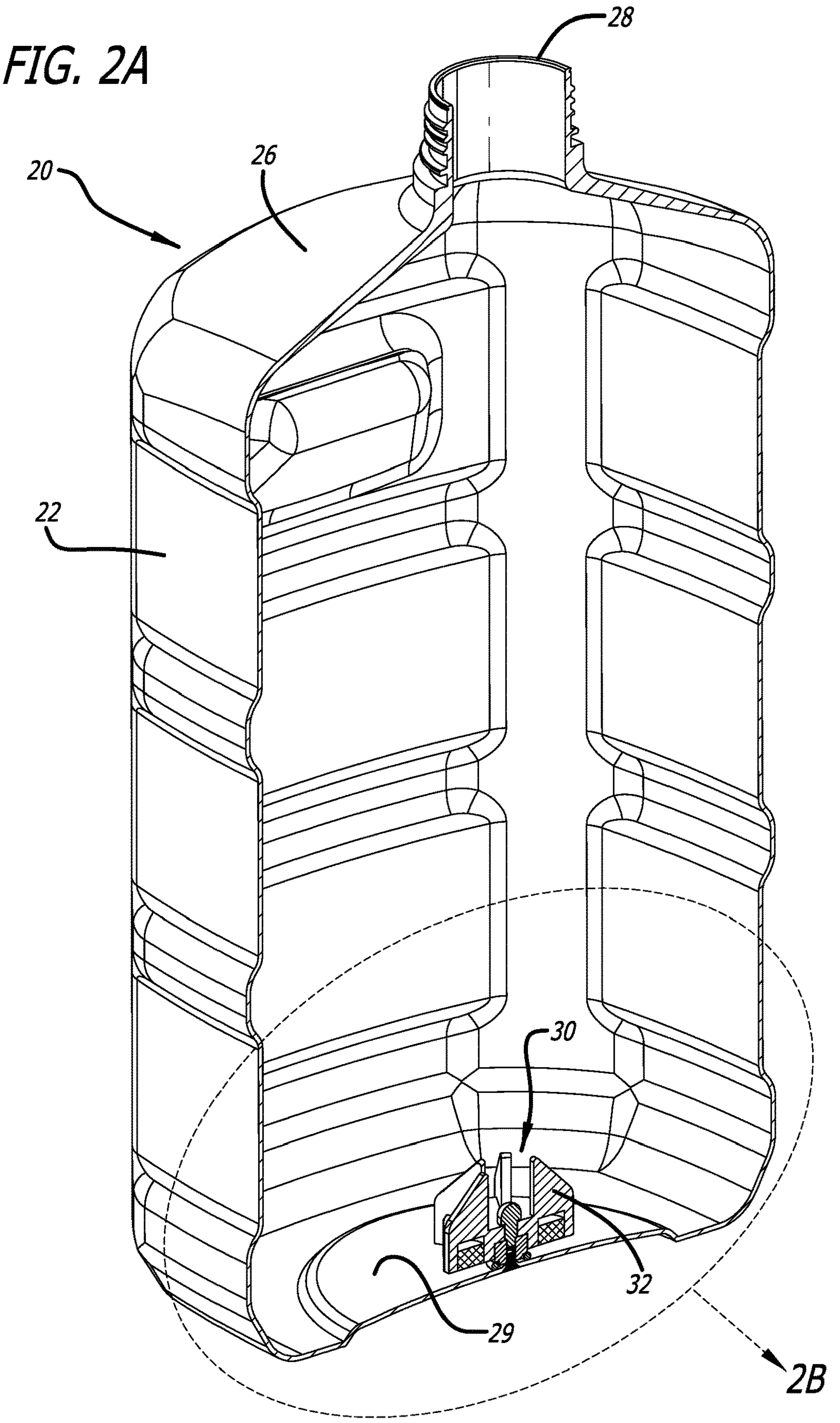
FIG. 2A is a cutaway view of the exemplary bottle illustrating an internal mixer with six vanes journaled to rotate about a lower floor thereof.
Figure 2B:
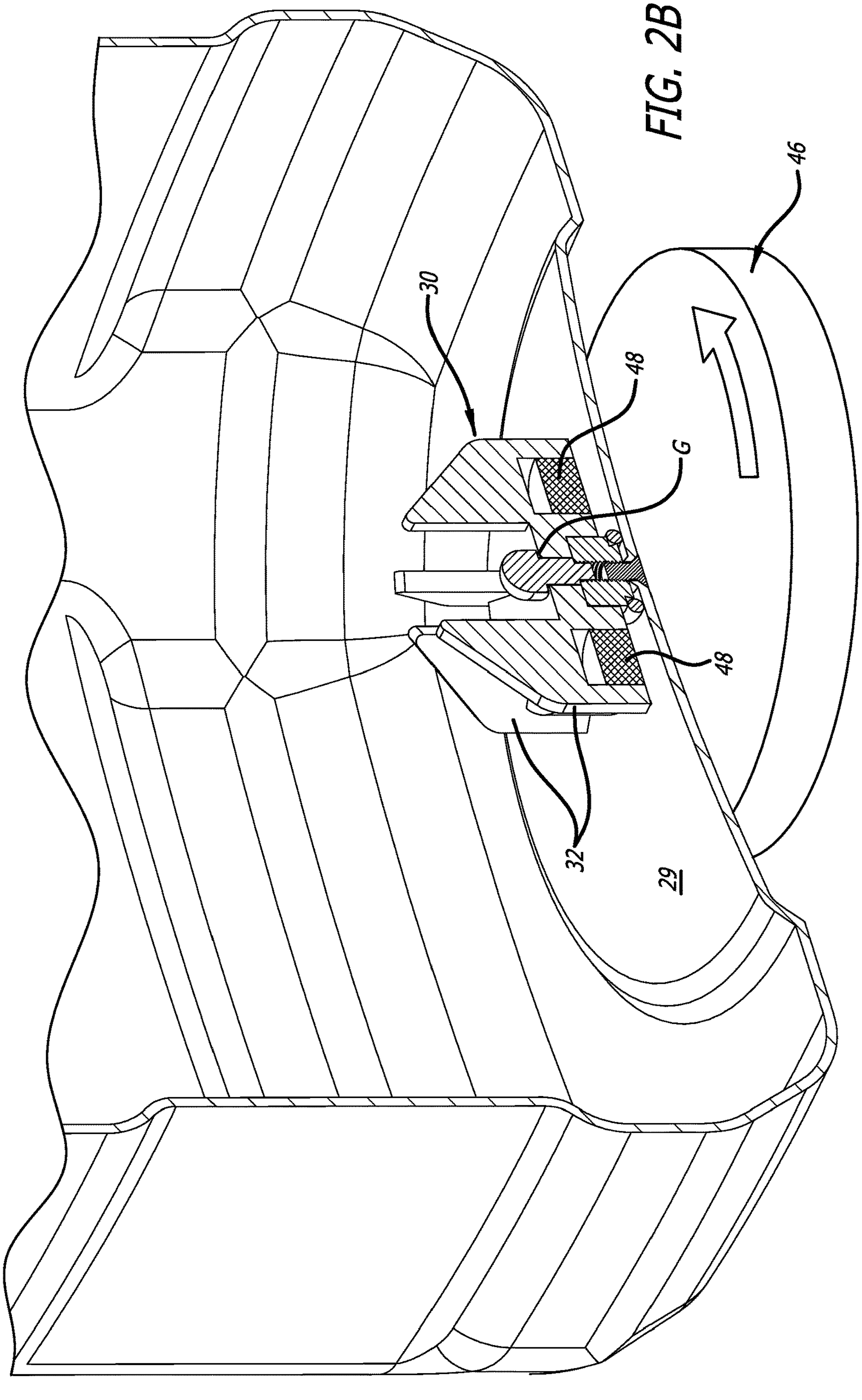
FIG. 2B is an enlargement thereof also schematically indicating an external magnetic drive below the bottle used to rotate the mixer.

FIG. 2A is a cutaway view of the exemplary bottle 20 illustrating an internal 6-vane mixer 30 with vanes 32 journaled to rotate about a vertical axis just above a lower floor 29 of the bottle. FIG. 2B is an enlargement of the mixer 30 that also schematically shows an external magnetic drive 46 (sometimes called a stir plate) below the bottle 20 used to rotate the mixer. For example, the mixer 30 may incorporate two diametrically opposed rare-earth or ceramic magnets 48 that face the floor 29, and the magnetic drive 46 has a rotating electromagnet or rotating rare-earth magnets (not shown) as well. Due to the close proximity to the mixer 30, the magnetic drive 46 is able to rotate the mixer.

One beneficial aspect of the present mixing systems is the ability to drop the mixer 30 in through the upper opening 28 of the bottle 20. Traditional stir bars used within process mixing bottles are slim and linearly elongated, making them easier to insert through small bottle mouths. The three-dimensional, generally disk-shaped mixer 30 with vanes 32 presents a more difficult problem in terms of being able to insert through a relatively narrow opening while still having sufficient width to adequately stir the fluid contents within the bottle. Consequently, "microsized" three-dimensional vaned or generally disk-shaped mixers are used. The mixer 30, as well as all of the mixers described herein, are generally rounded in plan view and have a central axis through which vertical planes of symmetry may be drawn. For instance, FIG. 2B shows a sectional view through the mixer 30 that is drawn diametrically through two opposite vanes 32, and defines a plane of symmetry, bisecting the mixer into two equal sides. Ignoring the presence of the magnets 48 and associated mounting cavities, a number of such planes of symmetry may be drawn through the mixer 30. Each mixer described herein is generally circular in plan view and has at least one vertical plane of symmetry through a central axis.

Figure 3:
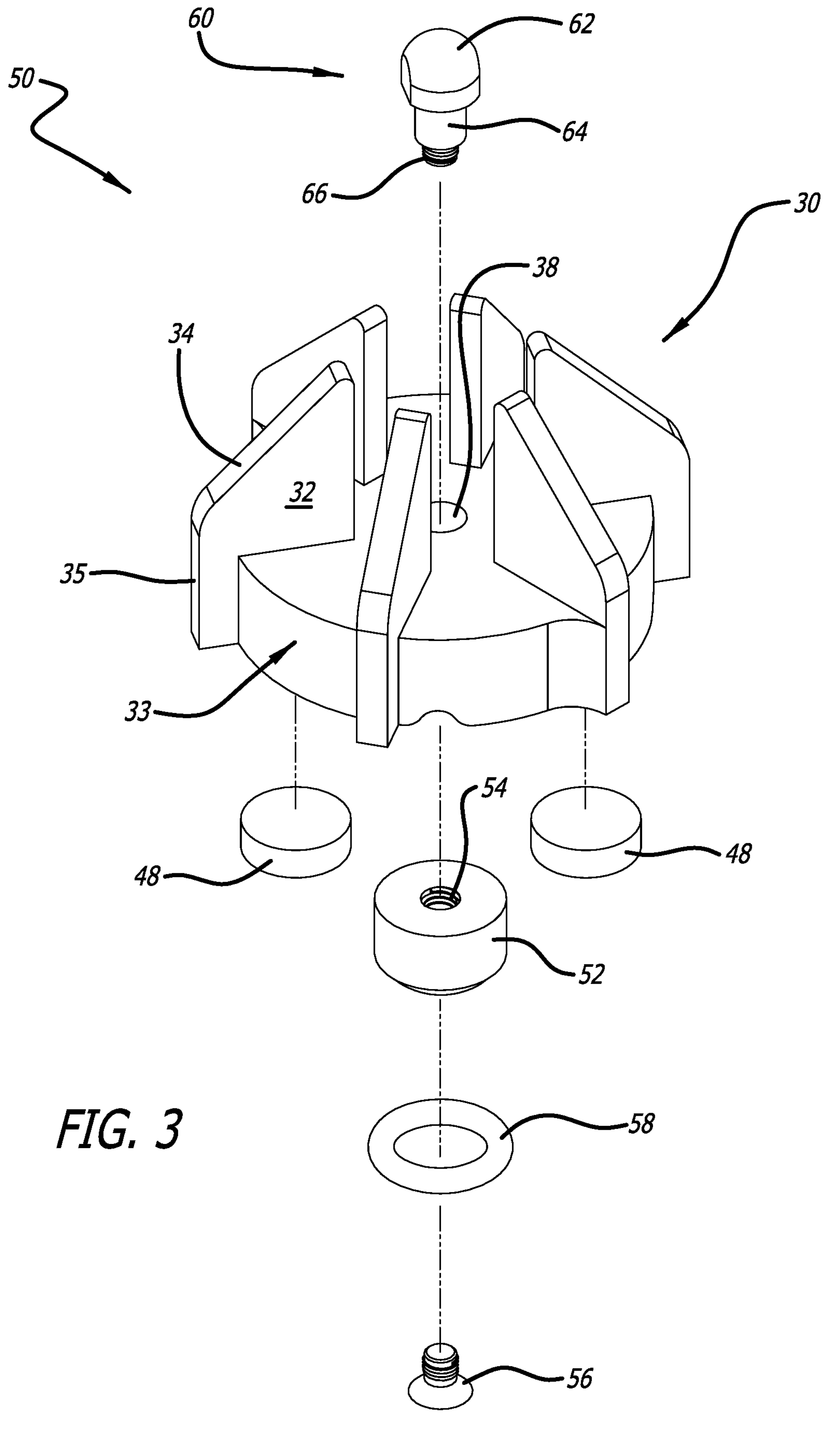
FIG. 3 is an exploded perspective view from above of an exemplary mixer assembly including a first exemplary bearing and two magnets held within the 6-vaned mixer.
Figure 4:
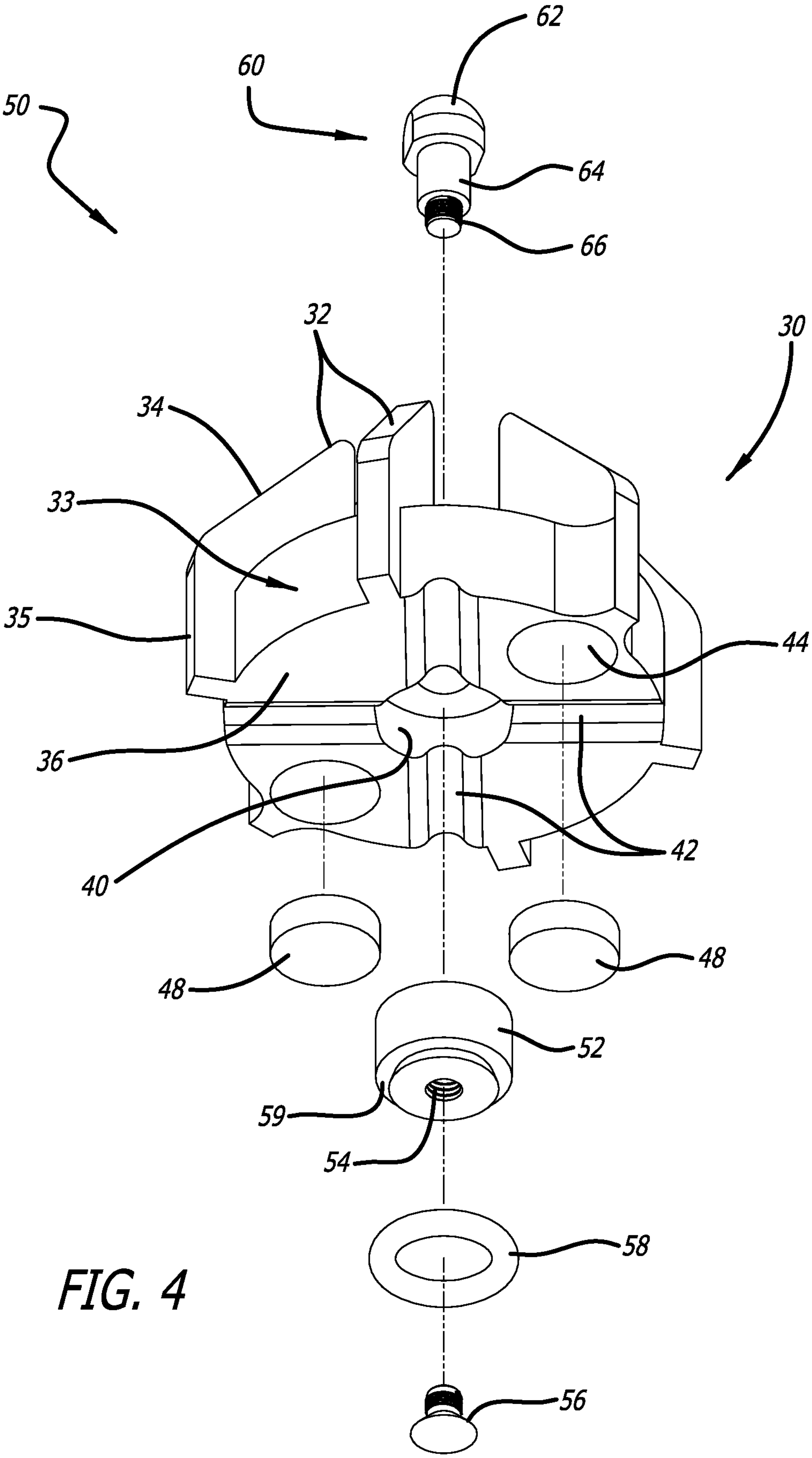
FIG. 4 is an exploded perspective view from below of the mixer assembly of FIG. 3.

FIGS. 3 and 4 are exploded perspective views from above and below, respectively, of an exemplary mixer assembly 50 including a bearing 52 and the two magnets 48 along with the mixer 30 having vanes 32. Reference is also made to the elevational, plan, and vertical sectional views of FIGS. 5A-5C.

The mixer 30 comprises a flat, generally cylindrical or disk-shaped body 33 from which the vanes 32 extend both vertically upward and radially outward. The vanes 32 are vertically-oriented, and shaped to have a generally triangular upper portion 34 above the body 33, and a flange-like outer portion 35 extending radially outward from the body. As seen in FIG. 4, the vanes 32 are preferably co-extensive with a lower face 36 of the body 33. There are desirably six evenly circumferentially spaced vanes 32, 600 circumferentially apart, though there may be as few as zero and as many as twelve, depending on the process requirements.

A central throughbore 38 opens to the top of the body 33 and extends downward through the lower face 36. The throughbore 38 widens and is contiguous with a lower end cavity 40 to receive the cylindrical bearing 52, as will be described below. FIG. 4 illustrates four radially-extending linear horizontal grooves 42 extending outward from the lower end cavity 40 to intersect an outer wall of the body 33 between vanes 32. The grooves 42 are preferably configured at 900 angles to each other and form a cross through the center of the disk-shaped body 33. The grooves 42 are slightly offset from the nearest vane 32 to avoid interfering with the mixing influence of each vane. The grooves 42 help stir the contents within the bottle 20, and in particular help break up any sediment that collects below the mixer 30. Finally, the mixer 30 defines two dead end cavities 44 open to its lower face 36 each of which receives one of the magnets 48 held within using adhesives or the like.

With reference again to FIG. 2B, the mixer assembly 50 mounts to the floor 29 of the bottle 20 via a pair of screws and the bearing 52. More particularly, the bearing 52 has a central vertical throughbore 54 which is internally threaded on both ends. A lower screw 56 (FIG. 3) projects upward through a hole in the center of the floor 29 and into the threaded bore 54. Tightening the screw 56 to the bearing 52 across the floor 29 sandwiches an elastomeric O-ring 58 between the bearing and the floor, thus creating a seal preventing leakage through the floor. In this regard, the bearing 52 has a stepped lower periphery 59 (see FIG. 4) which helps retain the O-ring 58 and enhances the seal thus created.

The upper end of the bearing 52 fits within the lower end cavity 40 of the mixer body 33, and an upper screw 60 passes down into the throughbore 38 and engages the threaded bore 54 of the bearing 52 from above. It should be noted that the upper screw 60 includes a head 62, shaft 64, and a threaded distal end 66. As seen in FIG. 2B, the shaft 64 has a length that is longer than a thickness of the mixer body 33 between its upper surface and the lower end cavity 40. Consequently, the upper screw 60 may be tightened onto the bearing 52, while the mixer 30 remains loosely constrained between the upper screw and the bearing due to a gap G between the mixer and screw head 62. Both the bearing 52 and the upper screw 60 are preferably formed of a lubricious material such as PEEK (Polyetheretherketone, a semicrystalline thermoplastic) or PPSU (polyphenylsulfone such as Radel®) for low friction rotation of the mixer 30. The mixer 30 may be formed of a variety of materials, such as stainless steel or a non-reactive polymer.

The mixer assembly 50 is configured such that the lower face 36 of the body 33 is spaced a small distance up from the floor 29 of the bottle 20. As mentioned, rotation of the mixer 30 occurs due to rotation of the magnetic elements within the magnetic drive 46, which attract and exert rotational torque on the magnets 48, and thus the mixer 30. The vanes 32 are tapered inward toward their upper portions 34 to help reduce shear in the fluid within the bottle 20. The radially outward flanges 35 help stir the fluid, also without generating much shear. Finally, the radial grooves 42 on the underside of the mixer body 33 gently stir the fluid in any sediment or precipitate that might collect underneath the mixer 30. The grooves 42 have a concave cross-section which minimizes sharp corners and facilitates stirring without shear.

Figure 5A:
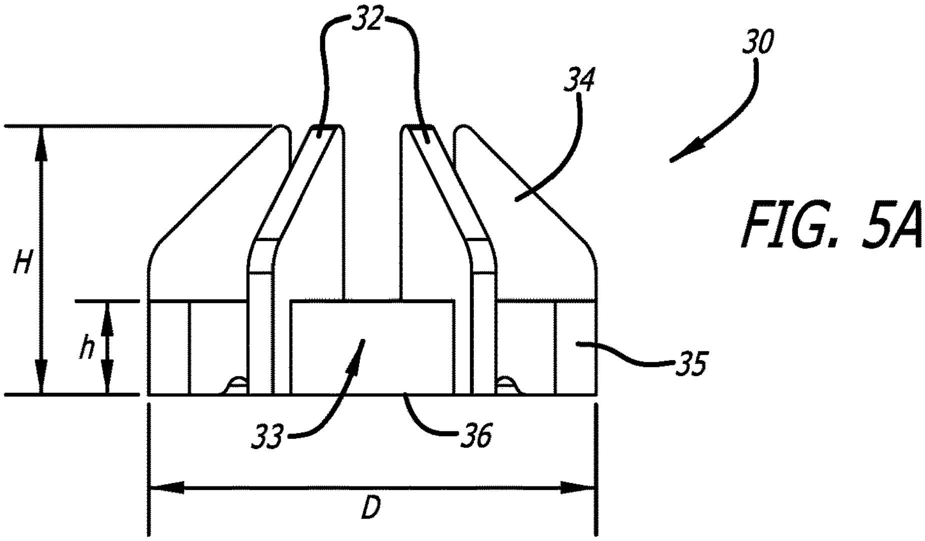
FIGS. 5A-5C are elevational, plan, and vertical sectional views through the 6-vaned mixer of FIG. 3.
Figure 5B:
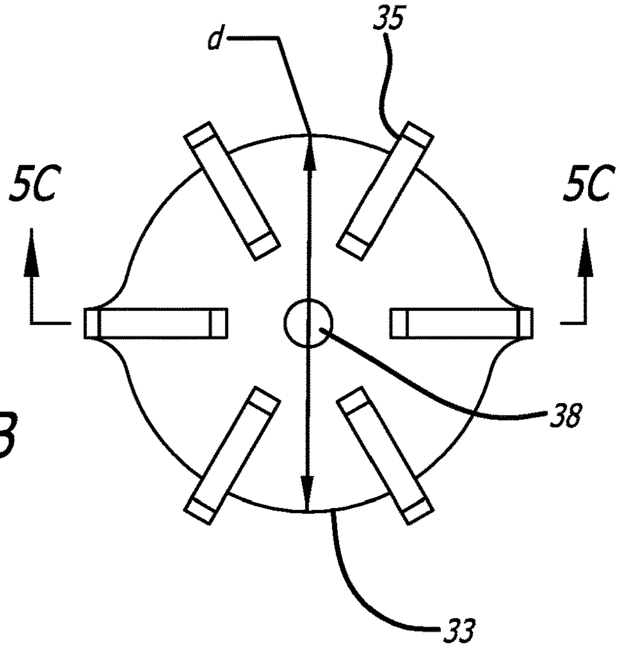
Figure 5C:
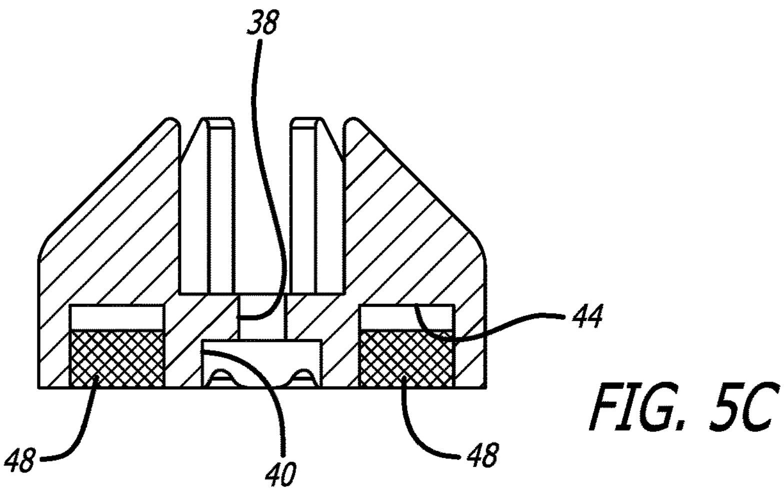

Exemplary dimensions of the mixer 30 are seen in FIGS. 5A-5C. Namely, the mixer 30 has an overall height H and diameter D, with a cylindrical body 33 of a height h and diameter d. This means that the vanes 32 project upward from the body 33 by a dimension of H−h, and extend radially outward from the body 33 by a dimension D−d. In one particular embodiment, the mixer 30 has an overall height H of about 26.32 mm (1.43 inches) and an overall diameter D of about 50.8 mm (2 inches), while the cylindrical body 33 has a height h of about 12.7 mm (0.5 inches) and a diameter d of about 44.45 mm (1.75 inches). Further, the radial grooves 42 on the underside of the mixer body 33 are about 4.75 mm (0.187 inches) deep, or between about 30-50% of the body height h. Of course, these dimensions are suitable for a particular size of mixer 30 for use in a particular size of bottle 20. These relative dimensions may be scaled up or down depending on different applications and bottle sizes.

As mentioned previously, one beneficial aspect of the present mixing systems is the ability to drop the mixer 30 in through the upper opening 28 of the bottle 20. To enable this, the overall diameter D of the mixer 30 is less than the opening diameter DB of the particular bottle. Thus, for a medium-sized bottle as in FIG. 1, with an upper opening 28 diameter DB of 70 mm, the overall diameter D of the mixer 30 is 50.8 mm. For smaller bottle 28 with an upper opening 28 diameter DB of 48 mm, the overall diameter D of the mixer 30 is less than 48 mm, preferably less than 40 mm. Finally, for a large bottle 28 with an upper opening 28 diameter DB of 150 mm, the overall diameter D of the mixer 30 is less than 150 mm, preferably less than 120 mm. Of course, these dimensions may vary depending on the bottle mouth size and mixer design.

The mixer assembly 50 is particularly well-suited for small volume bottom-mounted mixing. That is, the mixer 30 is constructed to be highly efficient at mixing very viscous powders that may settle to the bottom of the bottle 20 back into the larger suspension or colloidal mixture. In particular, the lower grooves 42 and outward flanges 35 are designed to agitate settled powder or settlement without creating excessive shear in the fluid mixture, which might be detrimental to the overall process. Moreover, the mixer 30 is shaped so that the torque required to rotate the mixer even in relatively thick or sedimentary fluids is relatively low. That is, the magnetic drive or stir plate 46 and magnets 48 need not be super strength to enable coupling of the two across the gap therebetween and rotate the mixer 30.

Figure 6A:
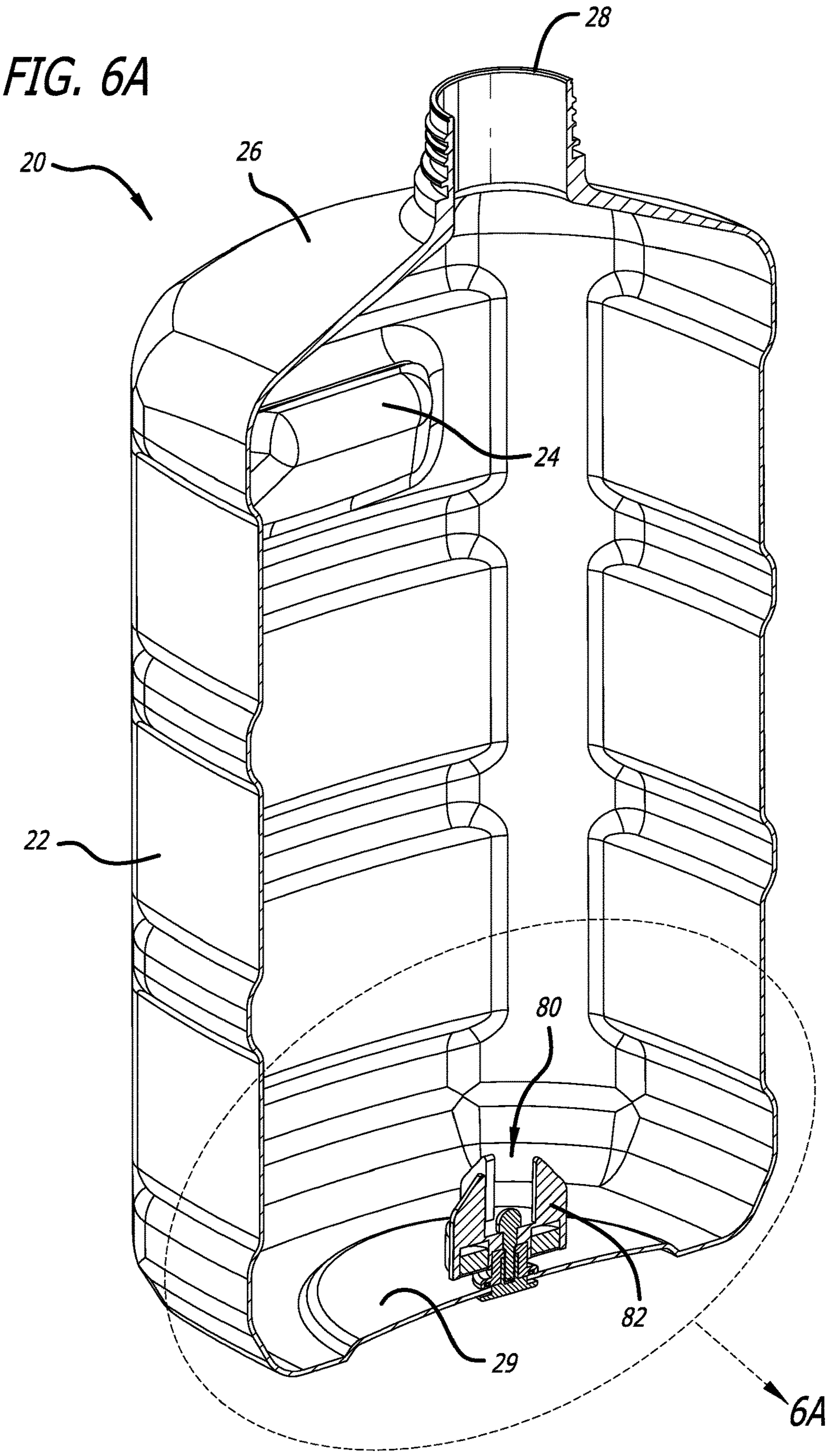
FIG. 6A is a cutaway view of the exemplary bottle illustrating an alternative internal mixer with four vanes journaled to rotate about a lower floor thereof.

FIG. 6A is a cutaway view of the exemplary bottle 20 illustrating an alternative internal "microsized" mixer 80 with four vanes 82 journaled to rotate about a vertical axis just above a lower floor 29 of the bottle. The bottle 20 again includes vertical sidewalls 22 which may be reinforced with ribs or other stiffening features as shown, and may incorporate indents 24 on opposite sides that function as handles. A top wall 26 leads to an upper opening 28, to which a cap (not shown) may be fastened for sealing the contents of the bottle.

The term "microsized" is used to indicate the relatively small overall three-dimensional size of the magnetically-driven mixers. One distinct advantage of such mixers is the ability to insert them through the relatively small mouth openings at the top of conventional reactor bottles, such as described above with respect to bottle 20 seen in FIG. 1. The mixers disclosed herein are solid body three-dimensional items which are small enough to pass through the mouth openings of these bottles. Of course, as explained above, different sized bottles have different sized mouth openings, and so the relative size of the mixers also may change. Some prior magnetically-driven mixers require conversion between a small or thin profile to fit through such bottle openings to an expanded size once they are within the interior of the bottle. The present mixers have a distinct advantage of being solid, static, immobile or otherwise inanimate bodies with no moving parts so as not to require any such size conversion. One simply drops the mixer into the bottle and affixes it into place, as will be described in more detail below. The term "solid" means not hollow and not having flow passages therein. There may be through-bores and cavities for receiving and/or holding fasteners or magnets, but these are not intended for fluid flow in and out of inner chambers.

Figure 6B:
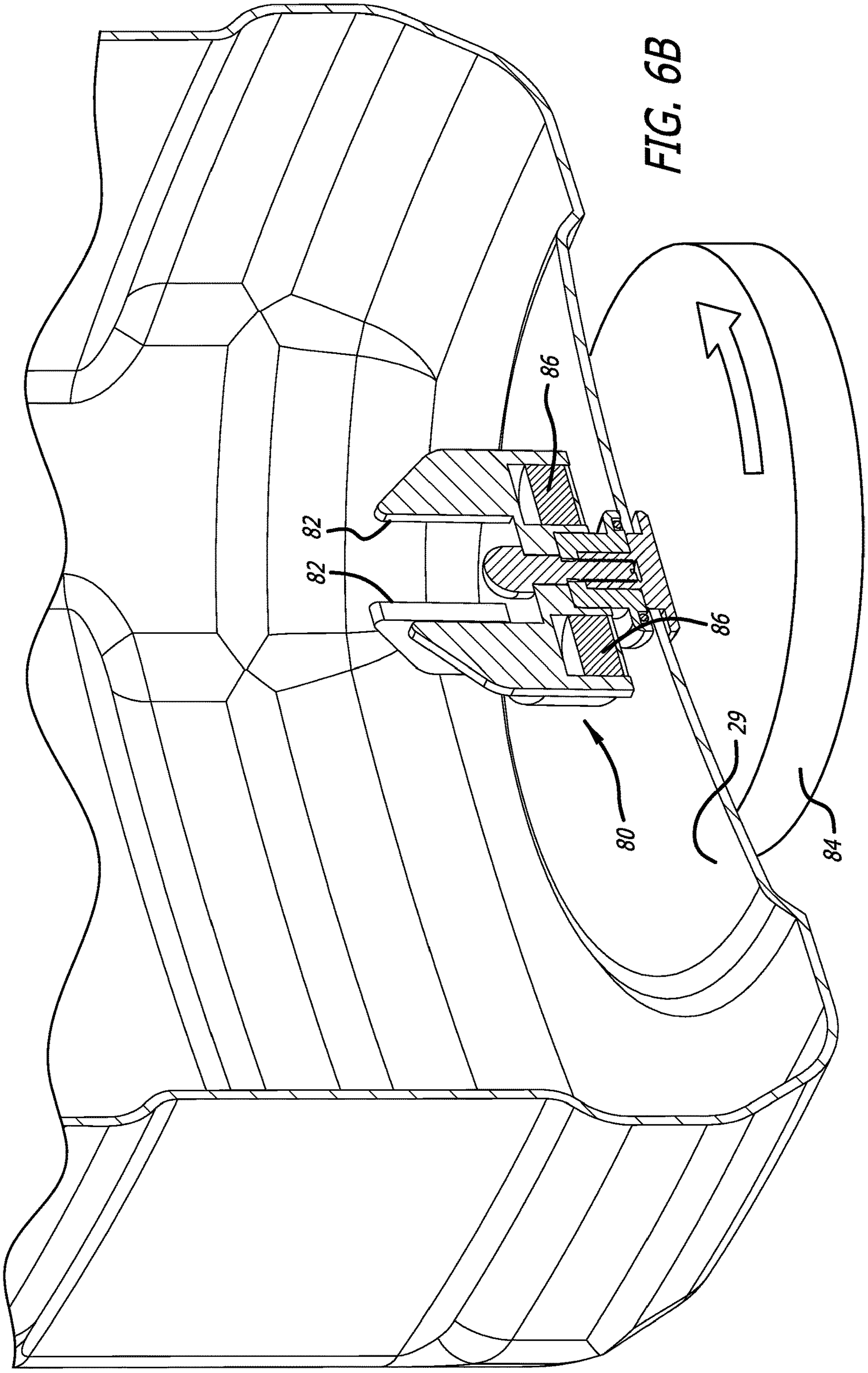
FIG. 6B is an enlargement of a lower portion thereof also schematically indicating an external magnetic drive below the bottle used to rotate the mixer.

FIG. 6B is an enlargement of a lower portion of the bottle 20 also schematically indicating an external magnetic drive 84 below the bottle used to rotate the mixer 80. For example, the mixer 80 may incorporate two diametrically opposed rare-earth or ceramic magnets 86 that face the floor 29, and the magnetic drive 84 has a rotating electromagnet or rotating rare-earth magnets (not shown) as well. Due to the close proximity to the mixer 80, the magnetic drive 84 is able to rotate the mixer.

Figure 6C:
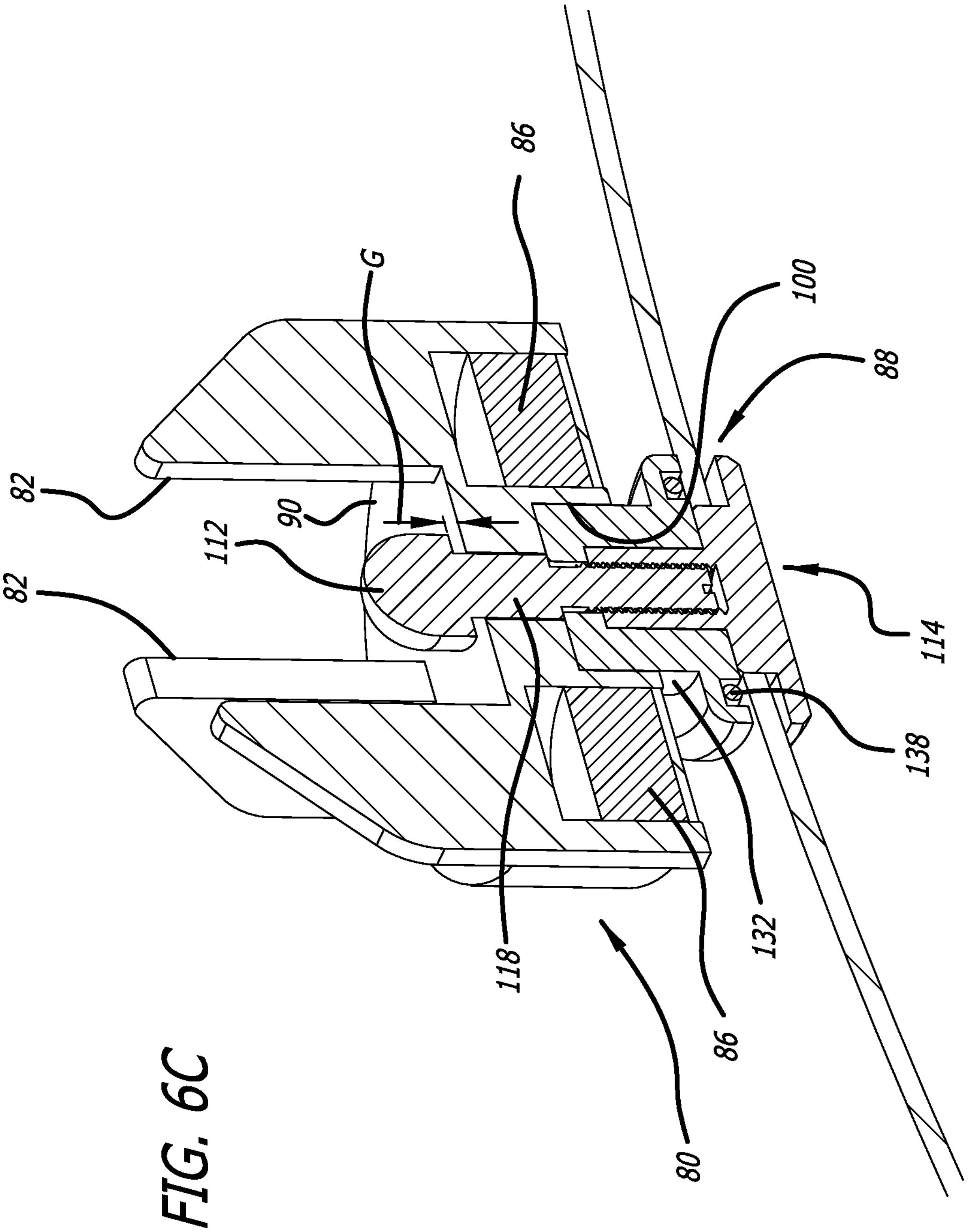
FIG. 6C is a detailed view of the 4-vaned mixer and a second exemplary bearing assembly sealed through a hole in the floor of the bottle.
Figure 7:
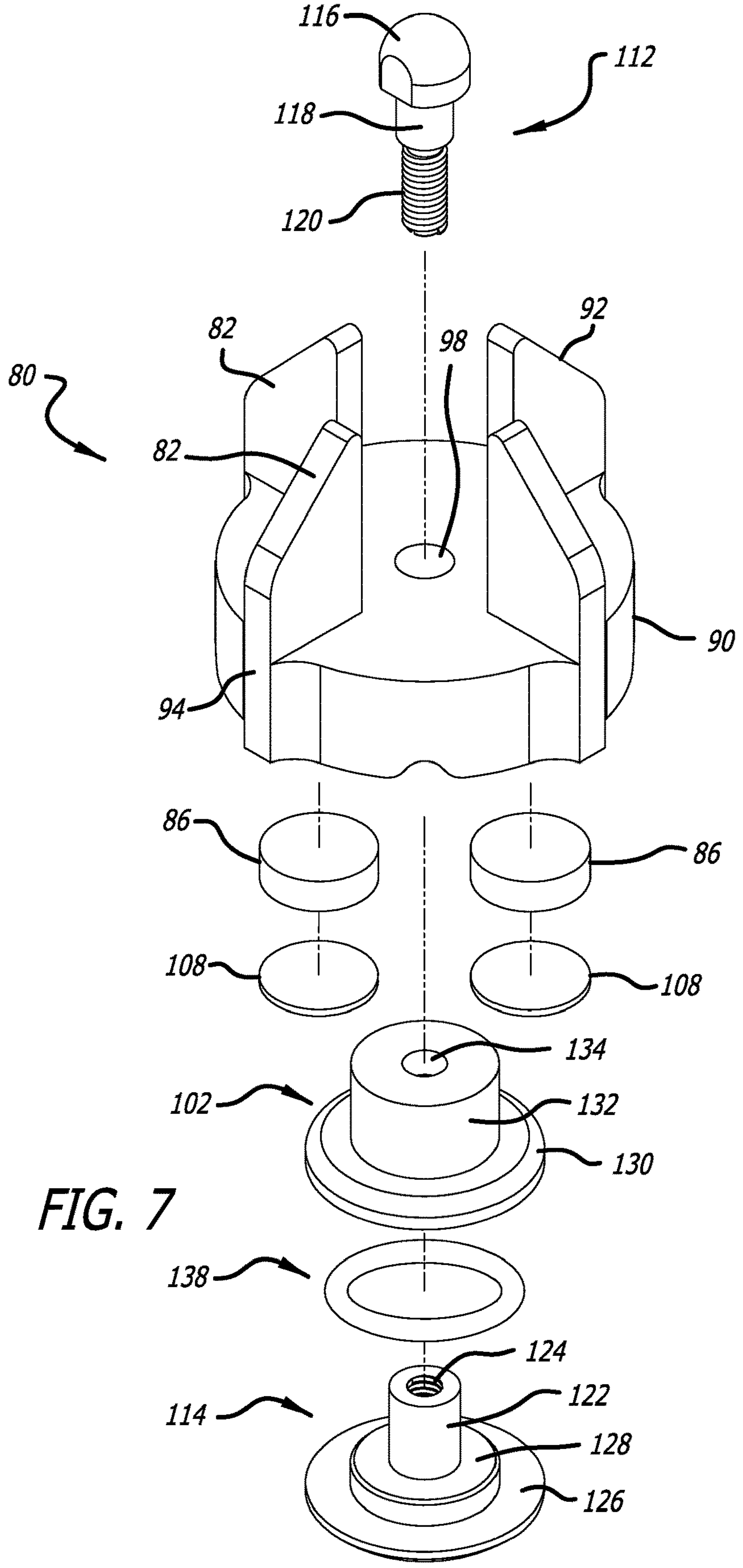
FIG. 7 is an exploded perspective view from above of an exemplary mixer assembly including the second exemplary bearing assembly and two magnets held within the 4-vaned mixer.
Figure 8:
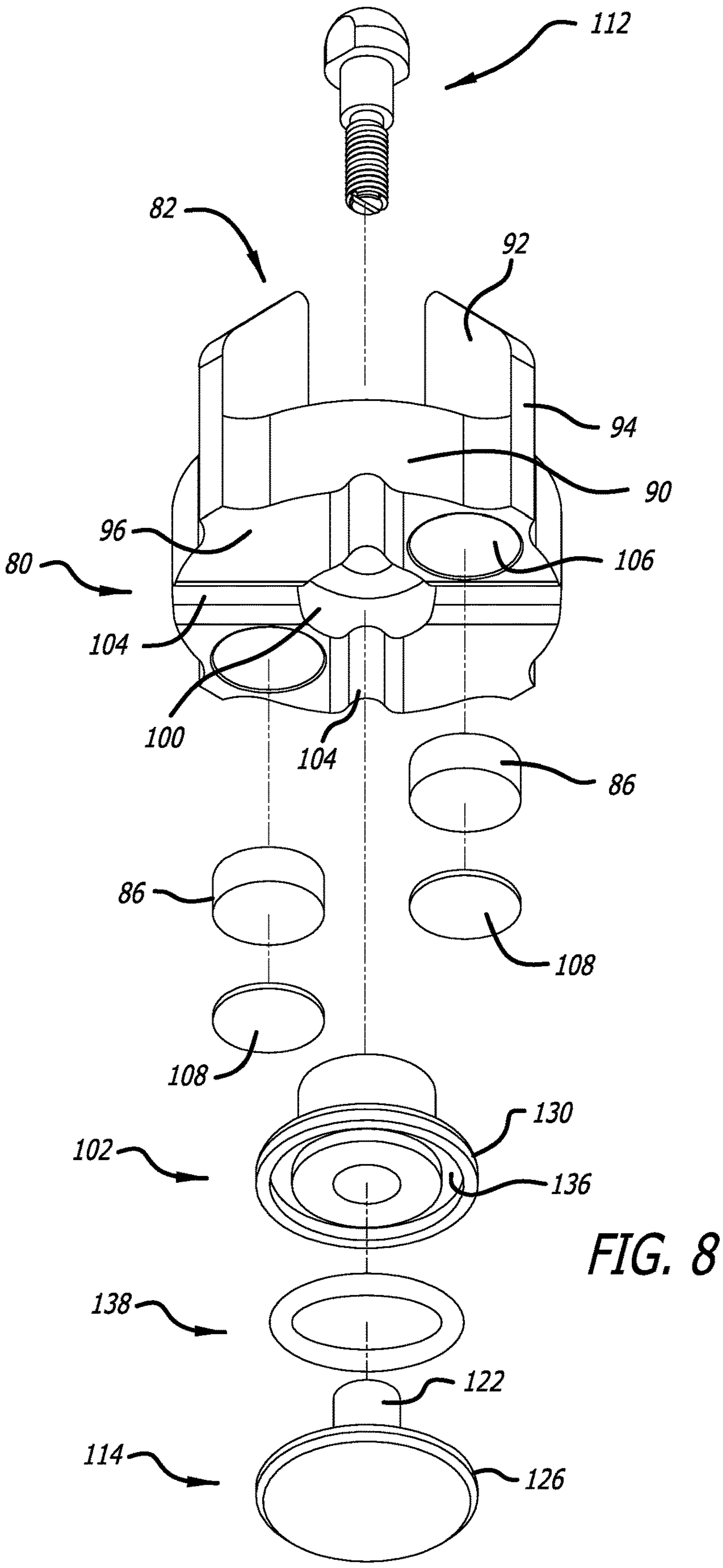
FIG. 8 is an exploded perspective view from below of the mixer assembly of FIG. 7.
Figure 9A:
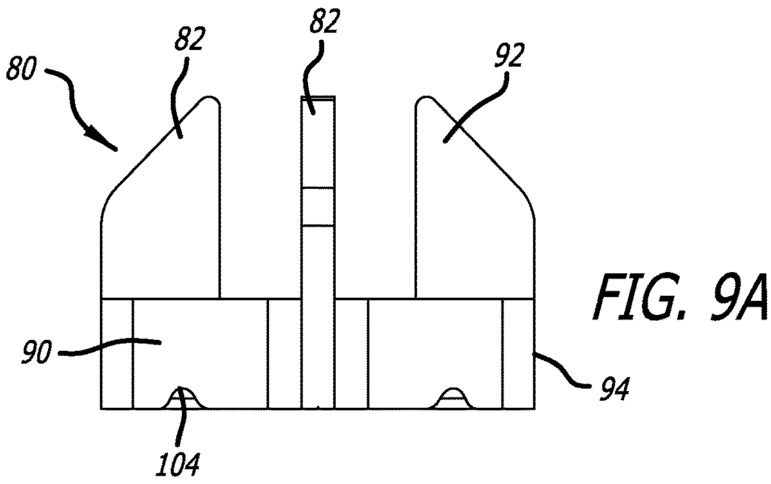
FIGS. 9A-9C are elevational, plan, and vertical sectional views through the 4-vaned mixer of FIG. 7.
Figure 9B:
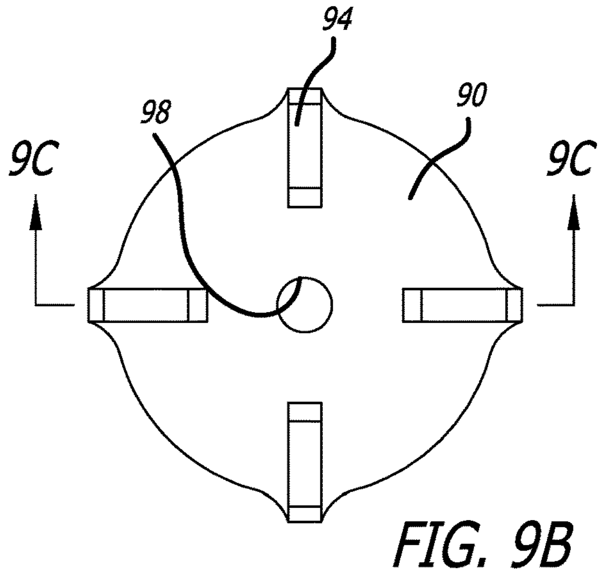
Figure 9C:
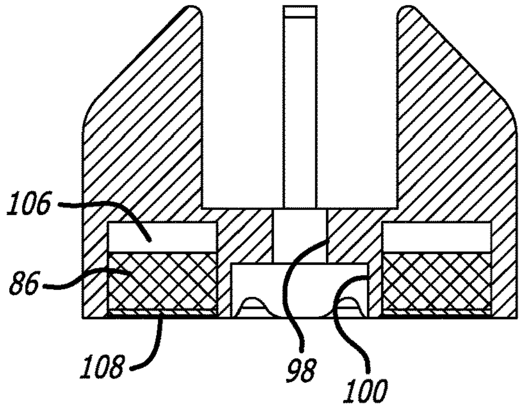

FIG. 6C is a detailed view of the 4-vaned mixer 80 and a second exemplary bearing assembly 88 sealed through a hole in the floor 29 of the bottle. FIGS. 7 and 8 are exploded perspective views from above and below, respectively, of the exemplary mixer 80 along with the bearing assembly 88 and the two magnets 86. Reference is also made to the elevational, plan, and vertical sectional views of FIGS. 9A-9C.

The mixer 80 comprises a flat, generally cylindrical or disk-shaped body 90 from which the vanes 82 extend both vertically upward and radially outward. The vanes 82 are vertically-oriented, and shaped to have a generally triangular upper portion 92 above the body 90, and a flange-like outer portion 94 extending radially outward from the body. As seen in FIG. 8, the vanes 82 are preferably co-extensive with a lower face 96 of the body 90. There are desirably four evenly circumferentially spaced vanes 82, 900 circumferentially apart, though there may be as few as zero and as many as twelve, depending on the process requirements. It is believed that four vanes 82 are better for gently mixing fluid in a bioreactor as the 90° spacing at certain desirable speeds reduces "drafting" of one vane following behind another in the rotation, thus improving agitation of the fluid.

A central throughbore 98 opens to the top of the body 90 and extends downward through the lower face 96. The throughbore 98 widens and is contiguous with a lower end cavity 100 that receives a portion of a cylindrical bearing member 102, as will be described below. FIG. 8 illustrates four radially-extending linear horizontal grooves 104 extending outward from the lower end cavity 100 to intersect an outer wall of the body 90 between vanes 82. The grooves 104 are preferably configured at 900 angles to each other and form a cross through the center of the disk-shaped body 90. The grooves 104 are evenly circumferentially offset from the nearest vanes 82 to avoid interfering with the mixing influence of each vane. The grooves 104 help stir the contents within the bottle 20, and in particular help break up any sediment that collects below the mixer 80. Finally, the mixer 80 defines two dead end cavities 106 open to its lower face 96 each of which receives one of the magnets 86 held within using adhesives or the like. To help prevent dead spaces within the cavities 106, thin end caps 108 may be affixed to their outer ends coplanar with the lower face 96 of the body 90.

As mentioned above, the mixer 80 is "microsized" three-dimensional, or generally disk-shaped so as to effectively provide mixing within bottle with relatively small mouth openings 28. The size of the mixer 80 relative to the 3 classes of bottles 28—small, medium, large—is as described above with respect to the 6-vaned mixer 30. The mixer 80 is generally rounded in plan view and have a central axis through which vertical planes of symmetry may be drawn.

With reference to FIGS. 6B, 7 & 8, the mixer 80 mounts to the floor 29 of the bottle 20 via an upper screw 112 that passes through the bearing member 102 and engages a lower holding nut 114, as will be explained. The upper screw 112 includes a head 116, a shaft 118, and a threaded distal end 120. The holding nut 114 has a central vertical column 122 with an internally threaded dead-end bore 124 projecting upward from a stepped base defined by a lower flange 126 and a smaller diameter cylindrical shoulder 128. The bearing member 102 has a wide base flange 130 extending outward at the bottom end of a generally tubular post 132 having a top through hole 134. The base flange 130 defines a circular channel 136 on its underside into which seats an elastomeric O-ring 138.

As seen in FIGS. 6B and 6C, the vertical column 122 of the holding nut 114 fits closely within an inner cavity defined within the tubular post 132 of the bearing member 102, and the tubular post 132 in turn fits closely within the lower end cavity 100 of the mixer body 90. The threaded bore 124 of the holding nut 114 is aligned with and positioned just below the top through hole 134 of the bearing member 102 and the throughbore 98 of the mixer body 90. The upper screw 112 can thus pass down into the throughbore 98 and through hole 134 to engage the threaded bore 124 of the holding nut 114 from above. The base flange 130 is thus pressed down such that the elastomeric O-ring 138 provides a fluid seal against the bottle floor 29. The cylindrical shoulder 128 of the holding nut 114 fits closely within the hole formed in the bottle floor 29, and the lower flange 126 may be adhered or otherwise bonded to the underside of the floor. This sealing arrangement ensures that reactor fluid within the bottle cannot reach the adhesive between the lower flange 126 and the bottle floor 29, which adhesive can sometimes deteriorate over time due to such exposure.

As seen in FIG. 6C, the screw shaft 118 has a length that is longer than a thickness of the mixer body 90 between its upper surface and the lower end cavity 100. Consequently, the upper screw 112 may be tightened onto the bearing member 102, while the mixer 80 remains loosely constrained between the upper screw 112 and the bearing member 102 due to a gap G between the mixer body 90 and screw head 116. Both the bearing member 102 and the upper screw 112 are preferably formed of a lubricious material such as PEEK (Polyetheretherketone, a semicrystalline thermoplastic) or PPSU (polyphenylsulfone such as Radel®) for low friction rotation of the mixer 80. The mixer 80 may be formed of a variety of materials, such as stainless steel or a non-reactive polymer.

The mixer 80 is configured such that the lower face 96 of the body 90 is spaced a small distance up from the floor 29 of the bottle 20. As mentioned, rotation of the mixer 80 occurs due to rotation of the magnetic elements within the magnetic drive 84, which attract and exert rotational torque on the magnets 86, and thus the mixer 80. The vanes 82 are tapered inward toward their upper portions 92 to help reduce shear in the fluid within the bottle 20. The radially outward flanges 94 help stir the fluid, also without generating much shear. Finally, the radial grooves 104 on the underside of the mixer body 90 gently stir the fluid in any sediment or precipitate that might collect underneath the mixer 80. The grooves 104 have a concave cross-section which minimizes sharp corners and facilitates stirring without shear.

Exemplary dimensions of the mixer 80 may be as described above for the 6-vane mixer 30 (see FIG. 5A). Namely, the mixer 80 has an overall height H and diameter D, with a cylindrical body 90 of a height h and diameter d. This means that the vanes 82 project upward from the body 90 by a dimension of H−h, and extend radially outward from the body 90 by a dimension D−d. In one particular embodiment, the mixer 80 has an overall height H of about 26.32 mm (1.43 inches) and an overall diameter D of about 50.8 mm (2 inches), while the cylindrical body 90 has a height h of about 12.7 mm (0.5 inches) and a diameter d of about 44.45 mm (1.75 inches). Further, the radial grooves 104 on the underside of the mixer body 90 are about 4.75 mm (0.187 inches), or between about 30-50% of the body height h. Of course, these dimensions are suitable for a particular size of mixer 80 for use in a particular size of bottle 20. These relative dimensions may be scaled up or down depending on different applications and bottle sizes. [MATT: not sure if these dimensions are correct, I only got the engineering drawings for the smaller 4-vaned impeller.]

The "microsized" mixer 80 is particularly well-suited for small volume bottom-mounted mixing. That is, the mixer 80 is constructed to be highly efficient at mixing very viscous powders that may settle to the bottom of the bottle 20 back into the larger suspension or colloidal mixture. In particular, the lower grooves 104 and outward flanges 94 are designed to agitate settled powder or settlement without creating excessive shear in the fluid mixture, which might be detrimental to the overall process. Moreover, the mixer 80 is shaped so that the torque required to rotate the mixer even in relatively thick or sedimentary fluids is relatively low. That is, the magnetic drive or stir plate 84 and magnets 86 need not be super strength to enable coupling of the two across the gap therebetween and rotate the mixer 80.

Figure 10:
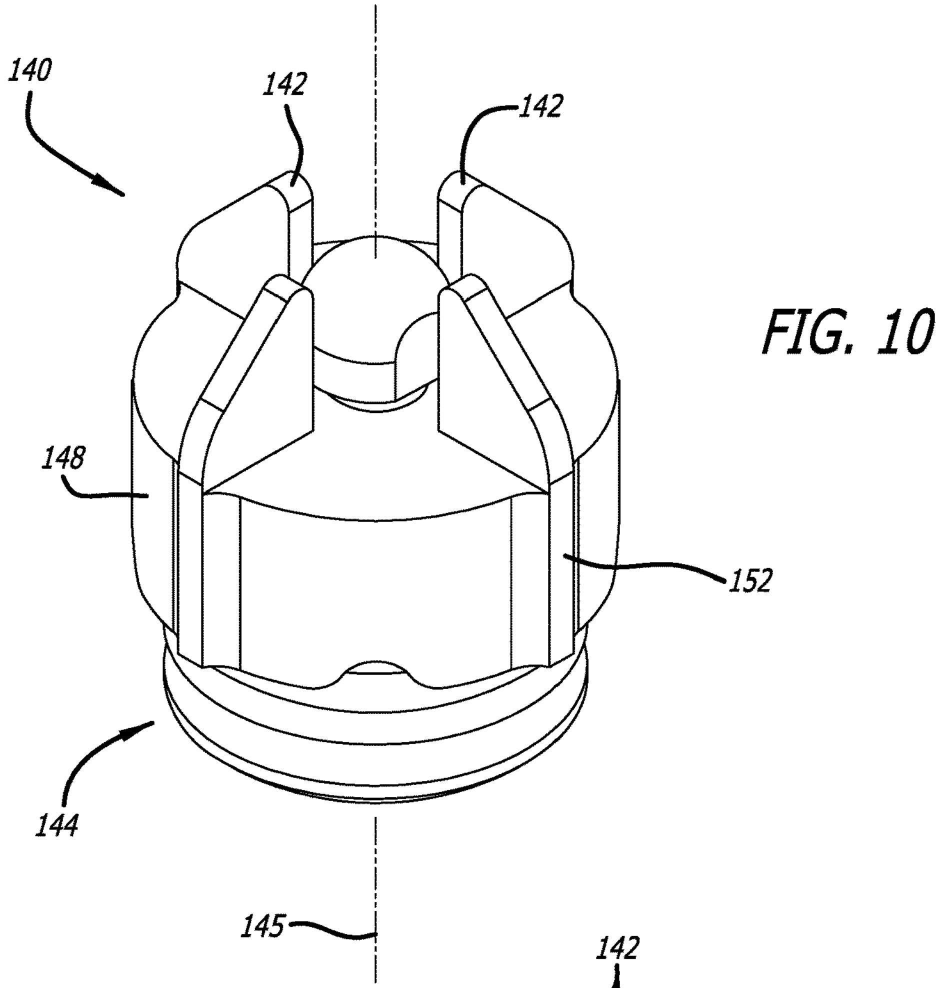
FIG. 10 is a perspective view of a further alternative internal mixer with four vanes journaled on another bearing assembly adapted to seal through a hole in the floor of the bottle.
Figure 11:
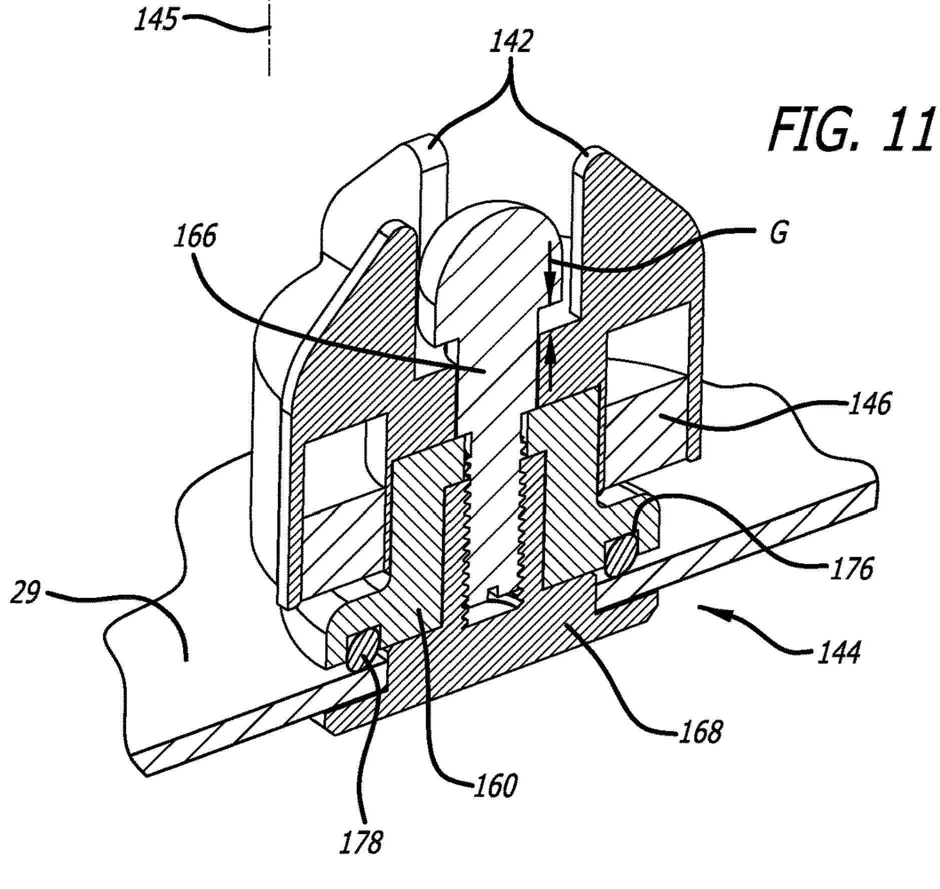
FIG. 11 is a detailed sectional view of the 4-vaned mixer of FIG. 10 and its bearing assembly sealed through a hole in the floor of the bottle.

FIG. 10 is a perspective view of a further alternative internal mixer 140 with four vanes 142 journaled on another bearing assembly 144 adapted to seal through a hole 29*a* (FIG. 13) in the floor 29 of a bottle, also seen in the detailed sectional view of FIG. 11. The alternative "microsized" mixer 140 with four vanes 142 is journaled to rotate about a vertical axis 145 just above a lower floor 29 of a bottle 20, such as described above. As mentioned above, the mixer 140 is "microsized" three-dimensional, or generally disk-shaped so as to effectively provide mixing within bottle with relatively small mouth openings 28, and is smaller in size than the 4-vaned mixer 80. The size of the mixer 140 relative to the 3 classes of bottles 28—small, medium, large—may be as described above with respect to the 6-vaned mixer 30. The mixer 140 is generally rounded in plan view and vertical planes of symmetry may be drawn through the central axis 145.

Again, an external magnetic drive 84 (FIG. 6B) positioned below the bottle may be used to rotate the mixer 140. For example, the mixer 140 may incorporate two diametrically opposed rare-earth or ceramic magnets 146 that face downward to the bottle floor 29, and the magnetic drive 84 has a rotating electromagnet or rotating rare-earth magnets (not shown) as well. Due to the close proximity to the mixer 140, the magnetic drive 84 is able to rotate the mixer.

FIG. 11 is a detailed view of the 4-vaned mixer 140 and its exemplary bearing assembly 144 sealed through the hole 29*a* in the floor 29 of the bottle, and FIGS. 12A-12D are elevational, plan, and vertical sectional views through the 4-vaned mixer. The mixer 140 comprises a flat, generally cylindrical or disk-shaped body 148 from which the vanes 142 extend both vertically upward and radially outward. The vanes 142 are vertically-oriented, and shaped to have a generally triangular upper portion 150 above the body 148, and a flange-like outer portion 152 extending radially outward from the body. As seen in FIG. 12, the vanes 142 are preferably co-extensive with a lower face 154 of the body 148. There are desirably four evenly circumferentially spaced vanes 142, ninety-degrees circumferentially apart, though there may be as few as zero and as many as twelve, depending on the process requirements. It is believed that four vanes 142 are better for gently mixing fluid in a bioreactor as the 90° spacing at certain desirable speeds reduces "drafting" of one vane following behind another in the rotation, thus improving agitation of the fluid.

A central throughbore 156 opens to the top of the body 148 and extends downward through the lower face 154. The throughbore 156 widens and is contiguous with a lower end cavity 158 that receives a portion of a cylindrical bearing member 160, as will be described below.

Figure 12A:
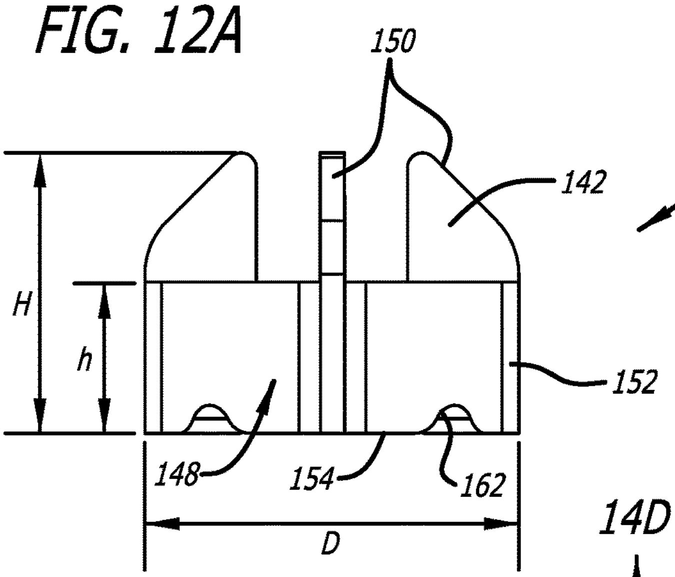
FIGS. 12A-12D are elevational, plan, and vertical sectional views through the 4-vaned mixer of FIG. 10.
Figure 12B:
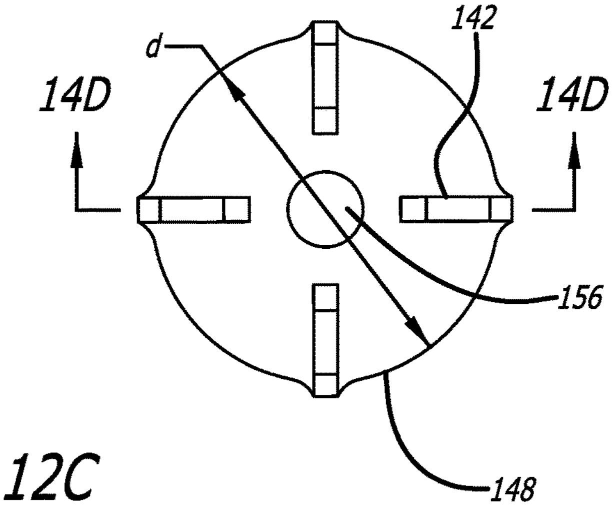
Figure 12C:
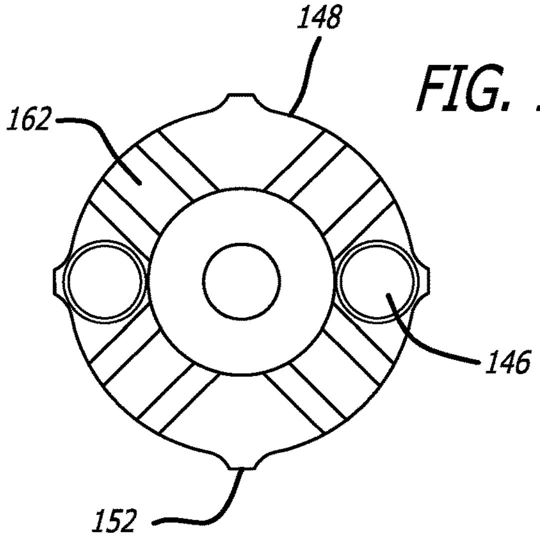
Figure 12D:
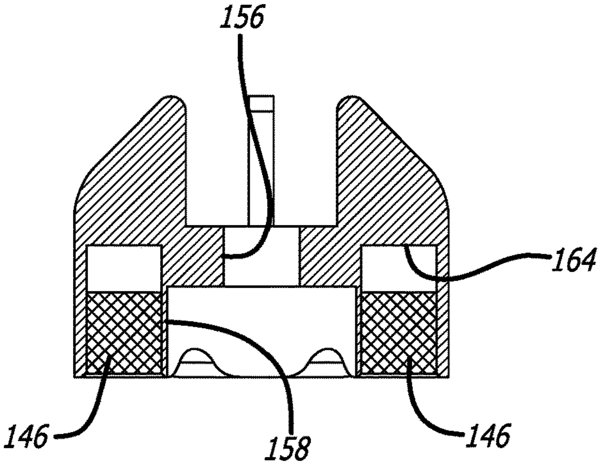

FIG. 12C illustrates four radially-extending horizontal grooves 162 extending outward from the lower end cavity 158 to intersect an outer wall of the body 148 between vanes 142. The grooves 162 are preferably configured at 900 angles to each other and form a cross through the center of the disk-shaped body 148. The grooves 162 are evenly circumferentially offset from the nearest vanes 142 to avoid interfering with the mixing influence of each vane. The grooves 162 help stir the contents within the bottle 20, and in particular help break up any sediment that collects below the mixer 140. Finally, the mixer 140 defines two dead end cavities 164 open to its lower face 154 each of which receives one of the magnets 146 held within using adhesives or the like. To help prevent dead spaces within the cavities 164, thin end caps may be affixed to their outer ends coplanar with the lower face 154 of the body 148, as indicated above in FIG. 8 at 108.

Figure 13:
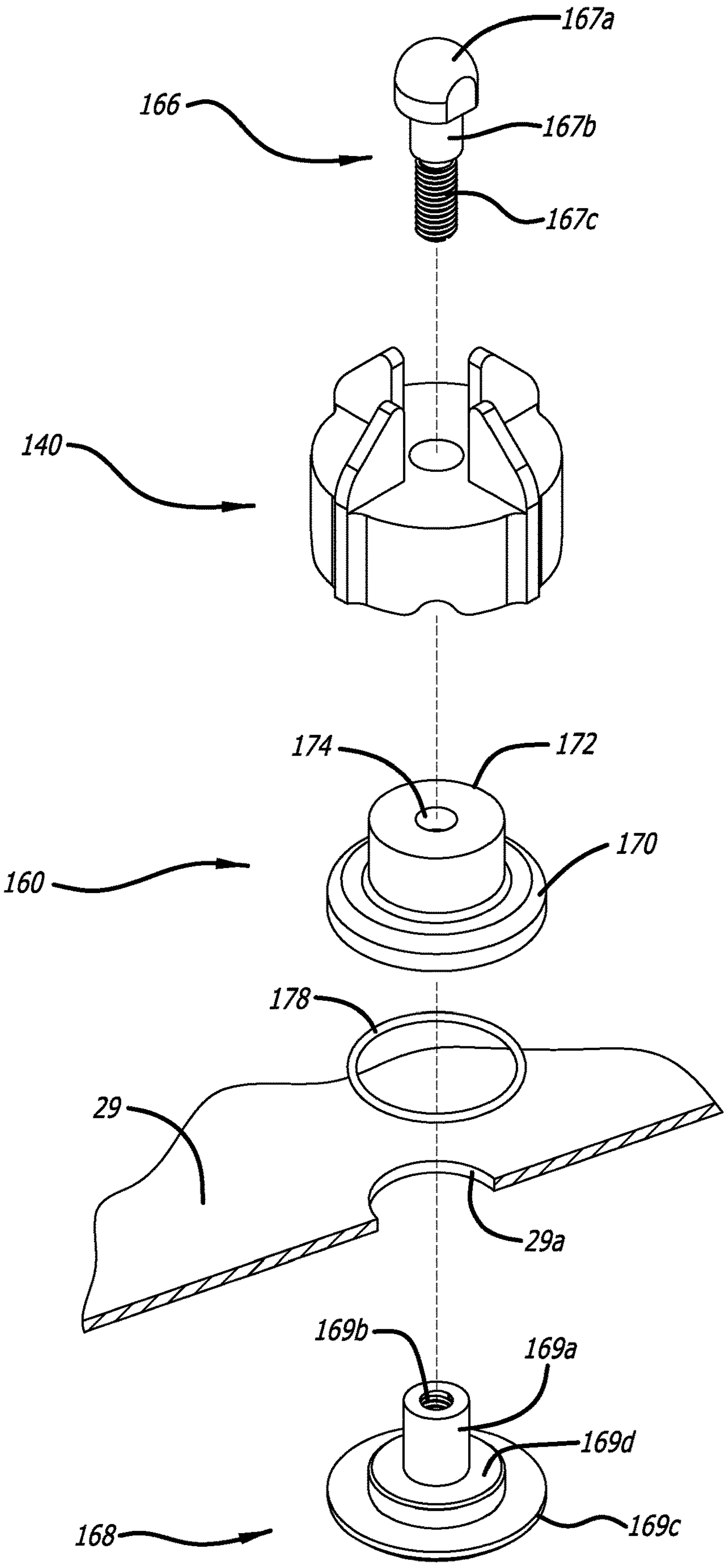
FIG. 13 is an exploded perspective view from above of the 4-vaned mixer of FIG. 10 including its bearing assembly.

With reference to FIGS. 11 & 13, the mixer 140 mounts to the hole 29*a* in the floor 29 of the bottle 20 via an upper screw 166 that passes through the bearing member 160 and engages a lower holding nut 168, as will be explained. The upper screw 166 includes a head 167*a*, a shaft 167*b*, and a threaded distal end 167*c*. The holding nut 168 has a central vertical column 169*a* with an internally threaded dead-end bore 169*b* projecting upward from a stepped base defined by a wide lower flange 169*c* and a smaller diameter cylindrical shoulder 169*d*. The bearing member 160 has a wide base flange 170 extending outward at the bottom end of a generally tubular post 172 having a top through hole 174. The base flange 170 defines a circular channel 176 (FIG. 11) on its underside into which seats an elastomeric O-ring 178.

Figure 14A:
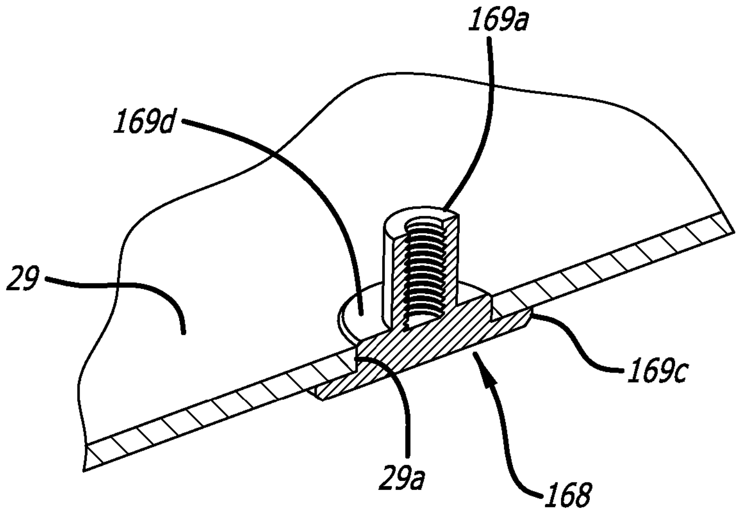
FIGS. 14A and 14B are perspective views of steps in the assembly of the 4-vaned mixer of FIG. 10 and its bearing assembly being sealed to a hole in the floor of the bottle.
Figure 14B:
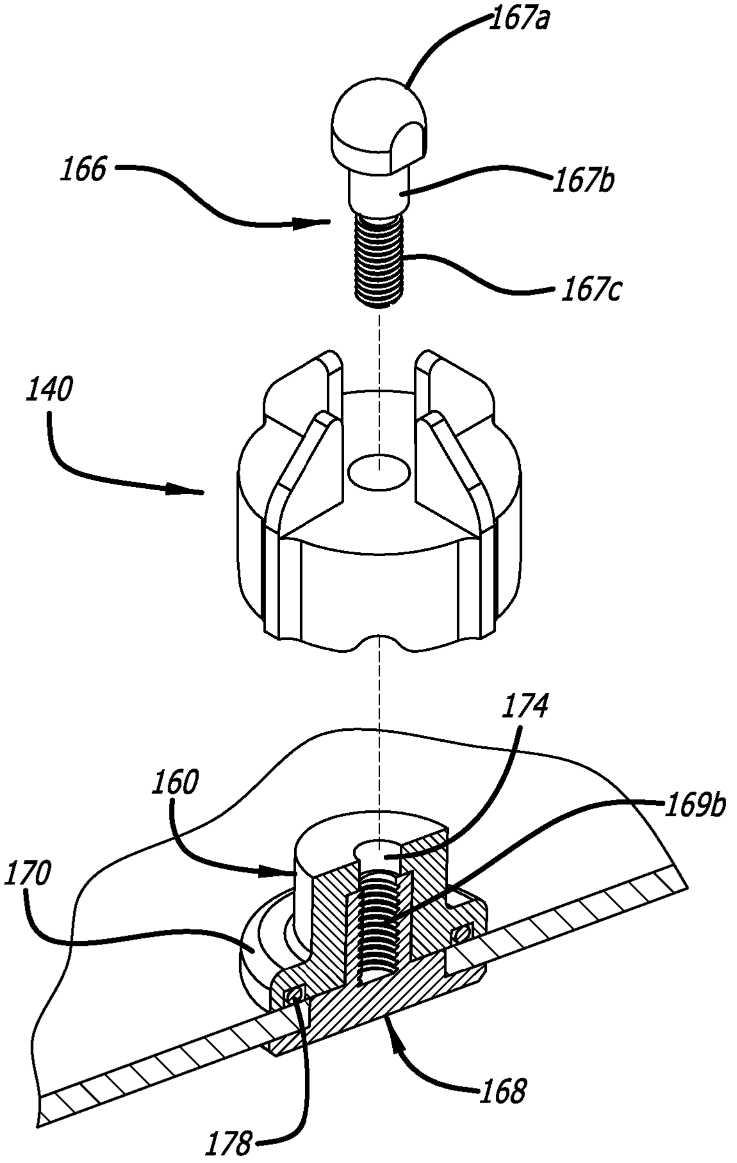

FIGS. 14A and 14B are perspective views of steps in the assembly of the 4-vaned mixer of FIG. 10 and its bearing assembly being sealed to the hole 29*a* in the floor 29 of the bottle. First, the holding nut 168 is inserted below into the hole 29*a*. The cylindrical shoulder 169*d* has a diameter that is the same as or just slightly smaller than the hole 29*a*, and the lower flange 169*c* lies in intimate contact with the flat lower surface of the floor 29. The holding nut 168 is a fixed in this position using heat or sonic welding, or an adhesive. Preferably, sonic welding is used to form a melted bond between the two components, which are preferably made of similar materials. As such, the holding nut 168 seals closed the hole 29*a*. Subsequently, the assembly of the mixer 140 and bearing member 160 are secured onto the vertical column 169*a* of the holding nut 168 using the upper screw 166. The base flange 170 of the bearing member 160 lies flush against the upper surface of the floor 29.

With reference again to FIGS. 8, 9A-9C and 11, once the mixer 140 and bearing 144 is assembled with the bottle, the vertical column 169*a* of the holding nut 168 fits closely within an inner cavity defined within the tubular post 172 of the bearing member 160, and the tubular post 172 in turn fits closely within the lower end cavity 100 of the mixer body 90. The threaded bore 169*b* of the holding nut 168 is aligned with and positioned just below the top through hole 174 of the bearing member 160 and the throughbore 98 of the mixer body 90. The upper screw 166 can thus pass down into the throughbore 98 and through hole 174 to engage the threaded bore 169*b* of the holding nut 168 from above. The base flange 170 is thus pressed down such that the elastomeric O-ring 178 provides a fluid seal against the bottle floor 29. The cylindrical shoulder 169*d* of the holding nut 168 fits closely within the hole formed in the bottle floor 29, and the lower flange 169*c* may be adhered or otherwise bonded to the underside of the floor. This sealing arrangement ensures that reactor fluid within the bottle cannot reach the bonding or adhesive between the lower flange 169*c* and the bottle floor 29 (adhesive can sometimes deteriorate over time due to such exposure).

As seen in FIG. 11, the screw shaft 167*b* has a length that is longer than a thickness of the mixer body 90 between its upper surface and the lower end cavity 100. Consequently, the upper screw 166 may be tightened onto the bearing member 160, while the mixer 140 remains loosely constrained between the upper screw 166 and the bearing member 160 due to a gap G between the mixer body 90 and screw head 167. Both the bearing member 160 and the upper screw 166 are preferably formed of a lubricious material such as PEEK (Polyetheretherketone, a semicrystalline thermoplastic) or PPSU (polyphenylsulfone such as Radel®) for low friction rotation of the mixer 140. The mixer 140 may be formed of a variety of materials, such as stainless steel or a non-reactive polymer.

The mixer 140 is configured such that the lower face 96 of the body 90 (see FIG. 8) is spaced a small distance up from the floor 29 of the bottle 20. As mentioned, rotation of the mixer 140 occurs due to rotation of the magnetic elements within the magnetic drive 84, which attract and exert rotational torque on the magnets 146, and thus the mixer 140. The vanes 142 are tapered inward toward their upper portions 150 to help reduce shear in the fluid within the bottle 20. The radially outward flanges 152 help stir the fluid, also without generating much shear. Finally, the linear radial grooves 162 on the underside of the mixer body 148 gently stir the fluid in any sediment or precipitate that might collect underneath the mixer 140. The grooves 162 have a concave cross-section which minimizes sharp corners and facilitates stirring without shear.

Exemplary dimensions of the mixer 140 include an overall height H and diameter D, with a cylindrical body 148 of a height h and diameter d. This means that the vanes 142 project upward from the body 148 by a dimension of H−h, and extend radially outward from the body 148 by a dimension D−d. In one particular embodiment, the mixer 140 has an overall height H of about 26.32 mm (0.929 inches) and an overall diameter D of about 31.50 mm (1.24 inches), while the cylindrical body 148 has a height h of about 12.7 mm (0.5 inches) and a diameter d of about 29.21 mm (1.15 inches). Further, the radial grooves 162 on the underside of the mixer body 148 are between about 20-50% of the body height h. Of course, these dimensions are suitable for a particular size of mixer 140 for use in a particular size of bottle 20. These relative dimensions may be scaled up or down depending on different applications and bottle sizes.

The "microsized" mixer 140 is particularly well-suited for small volume bottom-mounted mixing. That is, the mixer 140 is constructed to be highly efficient at mixing very viscous powders that may settle to the bottom of the bottle 20 back into the larger suspension or colloidal mixture. In particular, the lower grooves 104 and outward flanges 94 are designed to agitate settled powder or sediment without creating excessive shear in the fluid mixture, which might be detrimental to the overall process. In particular, Aluminum phosphate ($AlPO_4$), which is a common ingredient used for vaccine production, has a tendency to cake at the bottom if left to settle. Moreover, the mixer 140 is shaped so that the torque required to rotate the mixer even in relatively thick or sedimentary fluids is relatively low. That is, the magnetic drive or stir plate 84 and magnets 86 need not be super strength to enable coupling of the two across the gap therebetween and rotate the mixer 140.

Figure 15A:
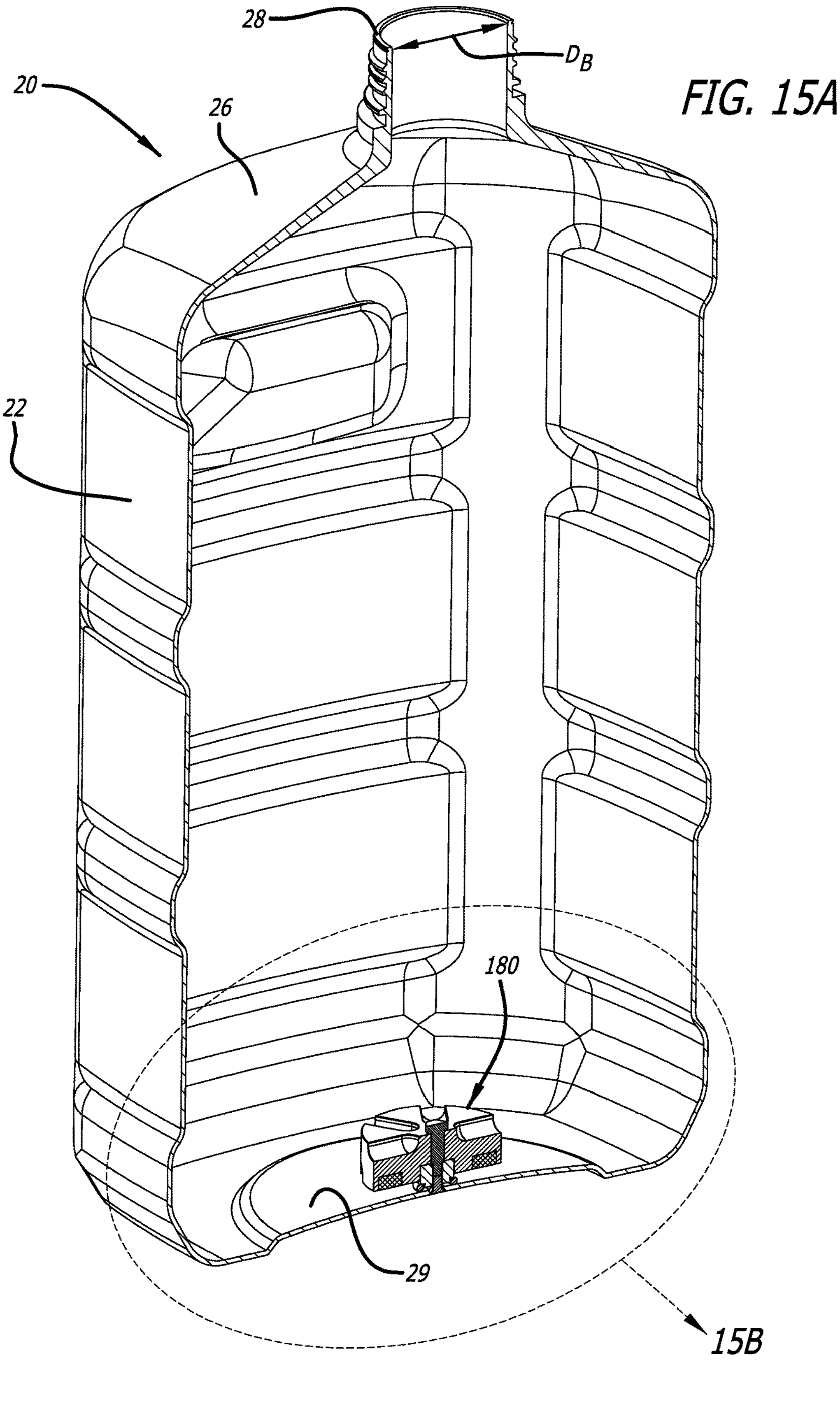
FIG. 15A is a cutaway view of the exemplary bottle illustrating an internal puck-shaped mixer journaled to rotate about a lower floor thereof.
Figure 15B:
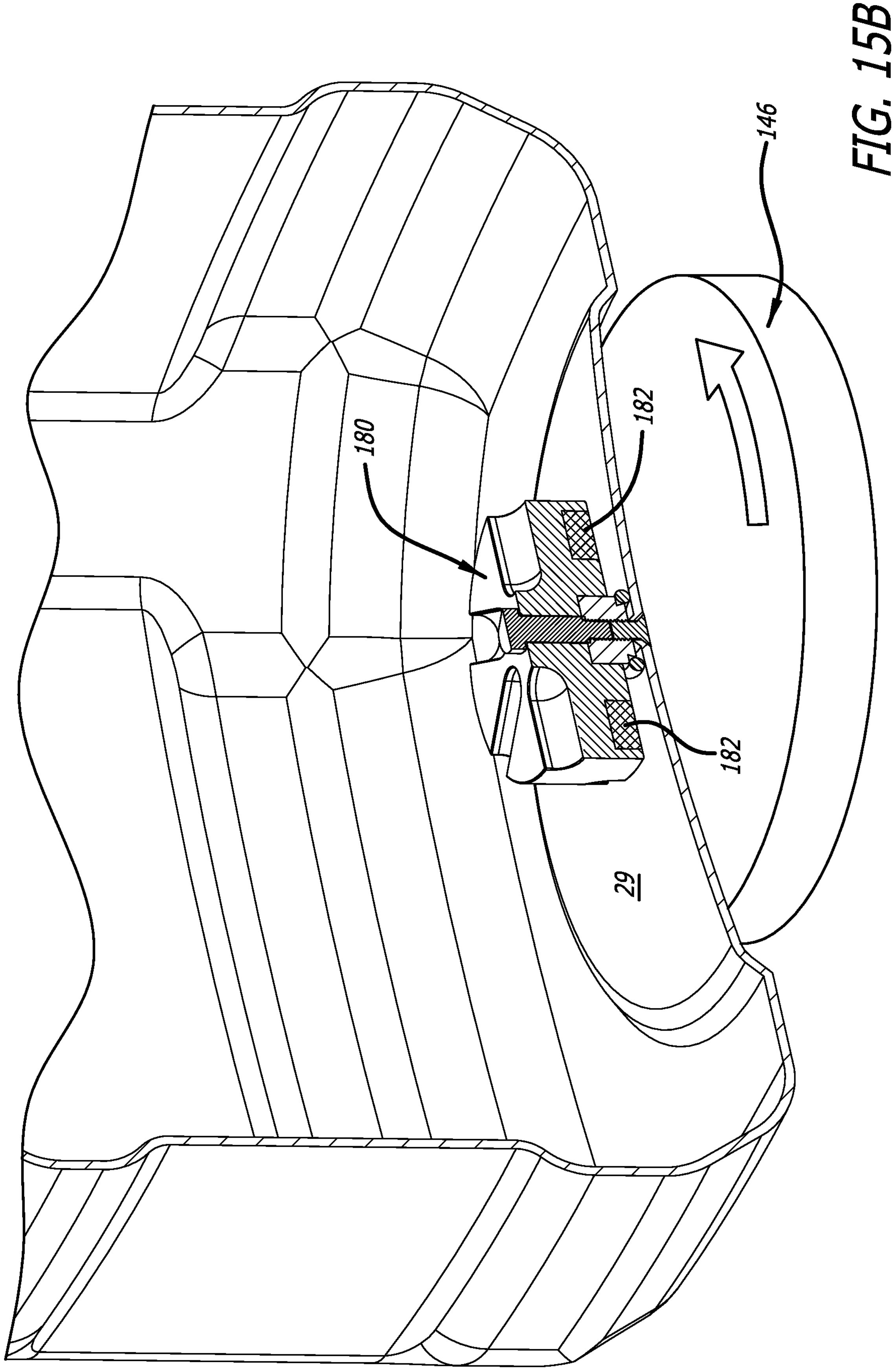
FIG. 15B is an enlargement thereof also schematically indicating an external magnetic drive below the bottle used to rotate the mixer.

FIG. 15A is a cutaway view of the exemplary bottle 20 illustrating an alternative "microsized" disk-shaped or puck-shaped mixer 180 journaled to rotate about a vertical axis just above the lower floor 29 of the bottle. FIG. 15B is an enlargement of the mixer 180 that also schematically shows an external magnetic drive 84 below the bottle 20 used to rotate the mixer. For example, the mixer 180 may incorporate two diametrically opposed rare-earth magnets 182 that face the floor 29, and the magnetic drive 84 has a rotating electromagnet or rotating rare-earth magnets (not shown) to rotate the mixer.

Figure 15C:
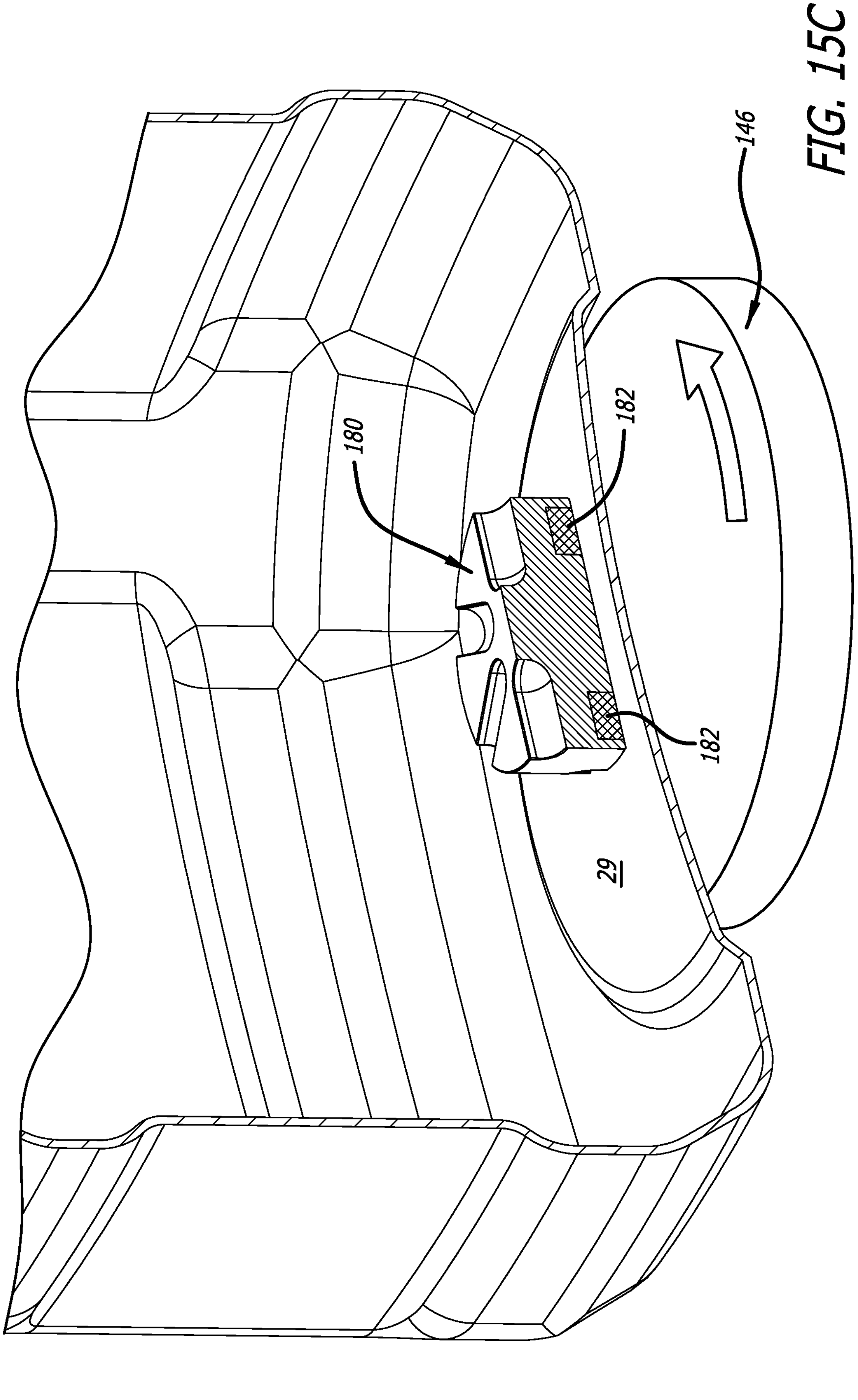
FIG. 15C is an enlargement of a still further alternative arrangement where the puck-shaped mixer rotates within the bottle without any bearing support.

FIG. 15C shows a still further alternative arrangement where the puck-shaped mixer 180 rotates within the bottle

20 without any bearing support. That is, for smaller bottles/mixer pairings, the puck-shaped mixer 180 has sufficient stability to rotate on-center without need of a bearing, much like traditional stir bars in the art. The spinning magnetic field generated by the external magnetic drive 84 below the bottle 20 attracts the magnets mounted within the mixer 180 and holds the mixer in place.

Figure 16:
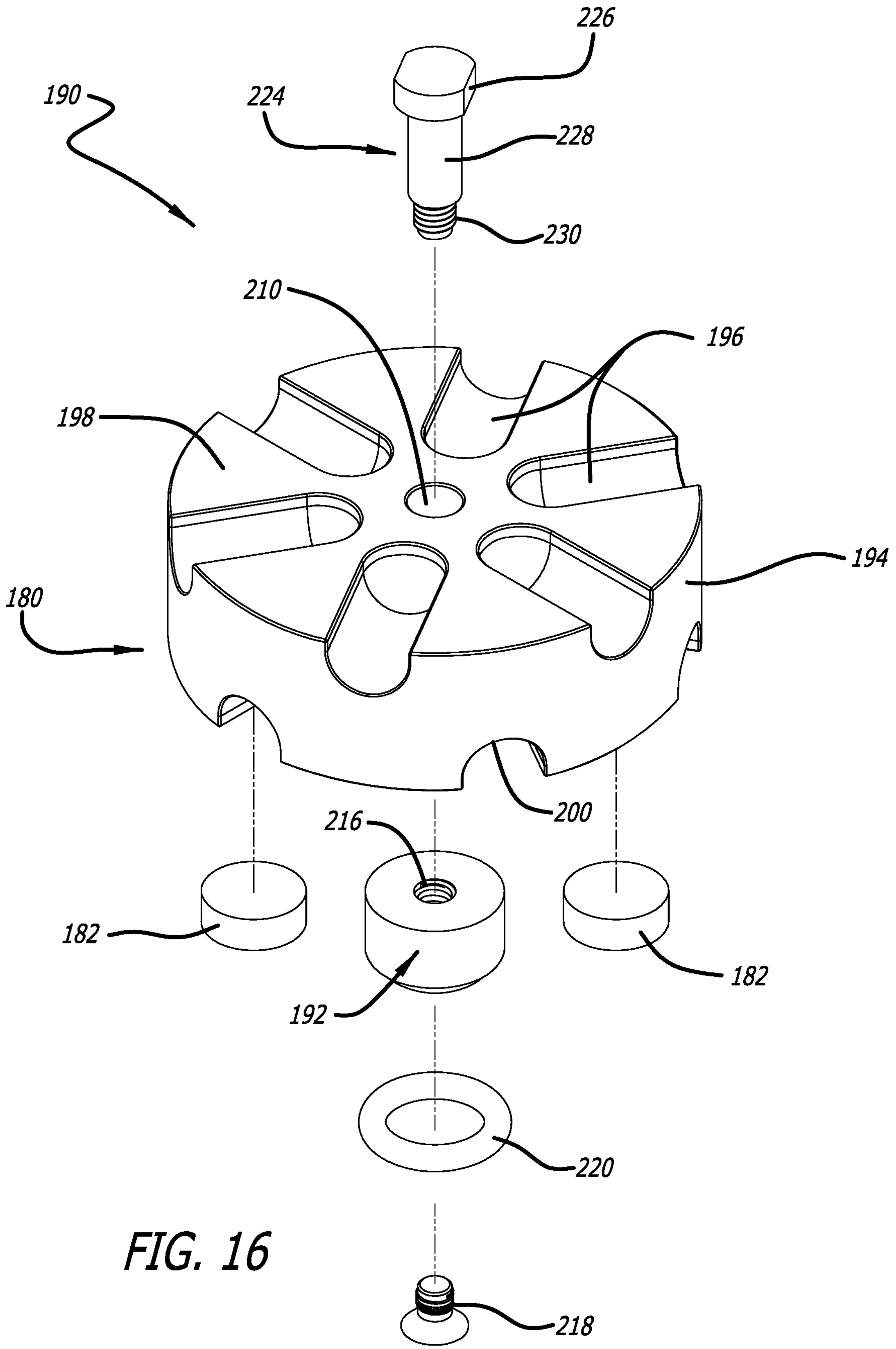
FIG. 16 is an exploded perspective view from above of an exemplary mixer assembly including the first exemplary bearing assembly and two magnets held within the puck-shaped mixer.
Figure 17:
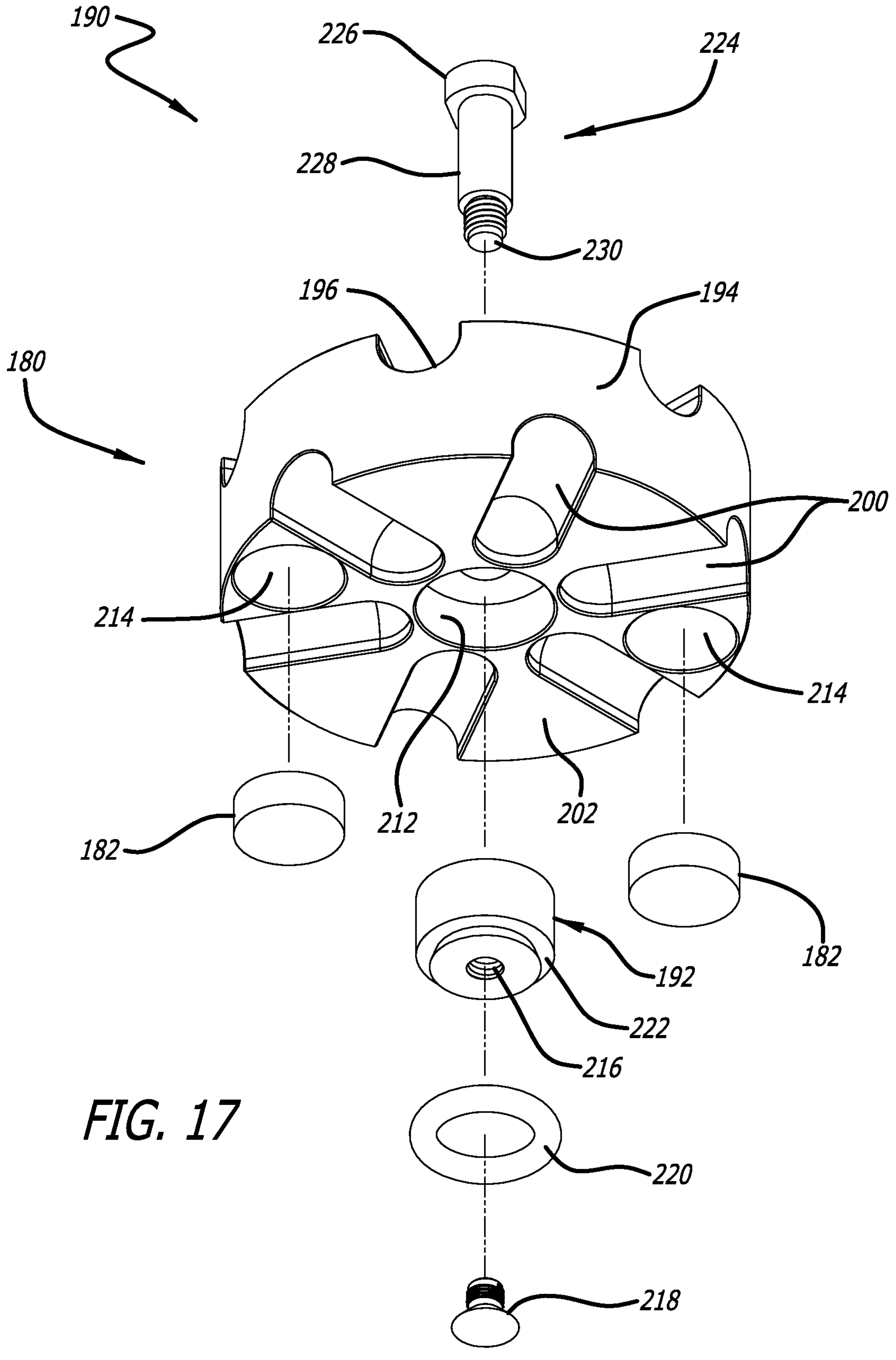
FIG. 17 is an exploded perspective view from below of the mixer assembly of FIG. 16.

FIGS. 16 and 17 are exploded perspective views from above and below, respectively, of an exemplary mixer assembly 190 including a bearing 192 along with the "microsized" mixer 180 having magnets 182. Reference is also made to the elevational, plan, and vertical sectional views of FIGS. 18A-18C.

The mixer 180 comprises a flat, generally cylindrical or puck-shaped body 194 without vanes, but having linear radial grooves on upper and lower surfaces. In particular, the body 194 has a series of radial grooves 196 formed in an upper face 198, and a series of radial grooves 200 formed in a lower face 202. There are desirably six evenly circumferentially spaced grooves 196, 200 on each top and bottom face, 60° apart, though there may be as few as two and as many as twelve, depending on the process requirements.

The grooves 196, 200 are generally semi-circular in radial cross-section, and extend along a majority of a radial dimension of the puck-shaped body 194. Each of the grooves 196, 200 and opens to a cylindrical outer surface of the body 194, and terminates at a generally spherical radially inner end. The grooves 196, 200 help stir the contents within the bottle 20, and in particular help break up any sediment that collects below the mixer 180.

A central throughbore 210 opens to the top of the body 194 and extends downward through the lower face 202. The throughbore 210 widens and is contiguous with a lower end cavity 212 to receive the cylindrical bearing 192, as will be described below. Finally, the mixer 180 defines two dead end cavities 214 open to its lower face 202 each of which receives one of the magnets 182 held within using adhesives or the like.

With reference again to FIG. 15B, the mixer assembly 180 mounts to the floor 29 of the bottle 20 via a pair of screws and the bearing 192. More particularly, the bearing 192 has a central vertical throughbore 216 which is internally threaded on both ends. A lower screw 218 (FIG. 3) projects upward through a hole in the center of the floor 29 and into the threaded bore 216. Tightening the screw 218 to the bearing 192 across the floor 29 sandwiches an elastomeric O-ring 220 between the bearing and the floor, thus creating a seal preventing leakage through the floor. In this regard, the bearing 192 has a stepped lower periphery 222 (see FIG. 4) which helps retain the O-ring 220 and enhances the seal thus created.

The upper end of the bearing 192 fits within the lower end cavity 212 of the mixer body 194, and an upper screw 224 passes down into the throughbore 210 and engages the threaded bore 216 of the bearing 192 from above. It should be noted that the upper screw 224 includes a head 226, shaft 228, and a threaded distal end 230. As seen in FIG. 15B, the shaft 228 has a length that is longer than a thickness of the mixer body 194 between its upper surface and the lower end cavity 212. Consequently, the upper screw 224 may be tightened onto the bearing 192, while the mixer 180 remains loosely constrained between the upper screw and the bearing due to a gap between the mixer and screw head 226. Both the bearing 192 and the upper screw 224 are preferably formed of a lubricious material such as PEEK (Polyetheretherketone, a semicrystalline thermoplastic) or PPSU (polyphenylsulfone such as Radel®) for low friction rotation of the mixer 180. The mixer 180 may be formed of a variety of materials, such as stainless steel or a non-reactive polymer.

Figure 18A:
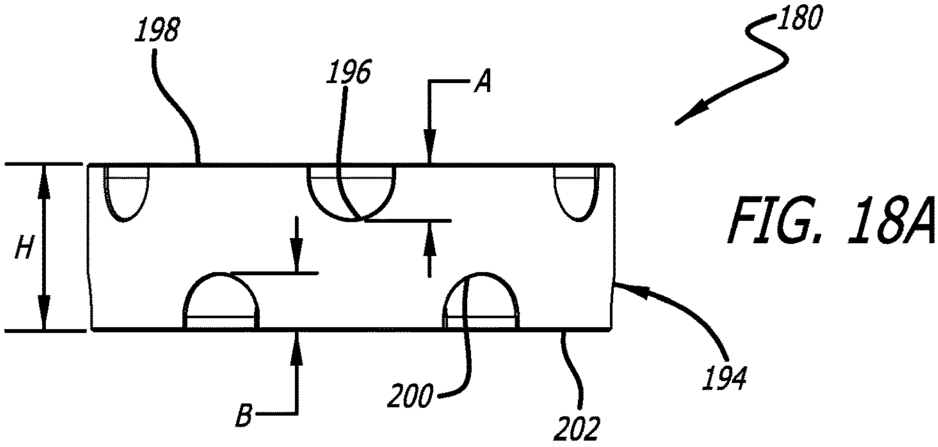
FIGS. 18A-18C are elevational, plan, and vertical sectional views through the puck-shaped mixer of FIG. 16.
Figure 18B:
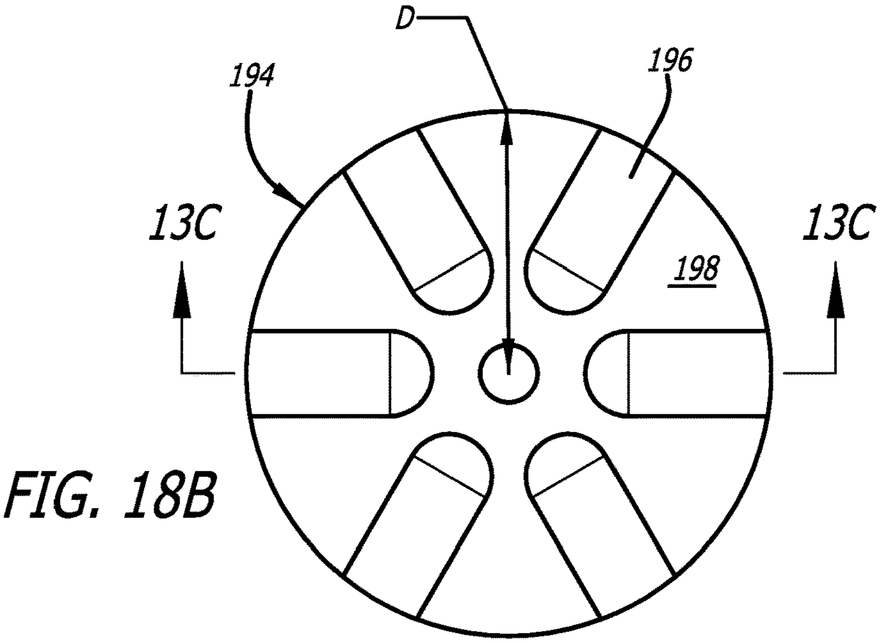
Figure 18C:
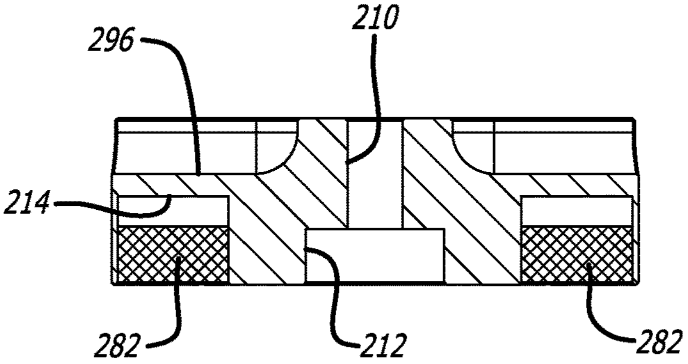

Exemplary dimensions of the mixer 180 are seen in FIGS. 18A-18C. Namely, the mixer 180 has an overall height H and diameter D. In one particular embodiment, the mixer 180 as an overall height H of about 12.7 mm (0.5 inches) and an overall diameter D of about 50.8 mm (2 inches). Of course, these dimensions are suitable for a particular size of mixer 180 for use in a particular size of bottle 20. These relative dimensions may be scaled up or down depending on different applications and bottle sizes. The grooves 196, 200 may have depths of between 20-50% of the overall height H of the mixer 180, such as about 25-33%. In one embodiment, the upper grooves 196 on the top are offset circumferentially from the lower grooves 200 on the bottom so that they do not create areas of extremely thin material therebetween, and both grooves are between 2.54-6.35 mm (0.1-0.25 inches) deep.

As mentioned above, the mixer 180 is "microsized" three-dimensional, or generally disk-shaped so as to effectively provide mixing within bottles with relatively small mouth openings 28. The size of the mixer 180 relative to the 3 classes of bottles 28—small, medium, large—is as described above with respect to the 6-vaned mixer 30. The mixer 180 is generally rounded in plan view and has a central axis through which vertical planes of symmetry may be drawn.

The mixer assembly 190 is particularly well-suited for small volume bottom-mounted mixing. That is, the mixer 180 is constructed to be highly efficient at mixing very viscous powders that may settle to the bottom of the bottle 20 back into the larger suspension or colloidal mixture. In particular, the grooves 196, 200 are designed to agitate settled powder or settlement without creating excessive shear in the fluid mixture, which might be detrimental to the overall process. Moreover, the mixer 180 is shaped so that the torque required to rotate the mixer even in relatively thick or sedimentary fluids is relatively low. That is, the magnetic drive or stir plate 84 and magnets 182 need not be super strength to enable coupling of the two across the gap therebetween and rotate the mixer 180.

One process that the puck-shaped mixer 180 is specially designed for is mixing Aluminum phosphate ($AlPO_4$), which is a common ingredient used for vaccine production. Previous mixing vessels for such applications had mixers such as stir bars that were insufficiently designed to stir up a caked sediment of $AlPO_4$ using indirect magnetic drives. Consequently, the typical process involved first lifting and shaking or hitting the mixing vessels to break up the sedimentary layer. Obviously, such a process introduces certain dangers such as actual injury to the technician, or simply loss of expensive product. The streamlined profile of the puck-shaped mixer 180 is specifically designed to start rotating even when surrounded by heavy sediment, and the grooves 196, 200 provide sufficient turbulence to the fluid to break up the sediment using a relatively low drive torque.

Figure 19:
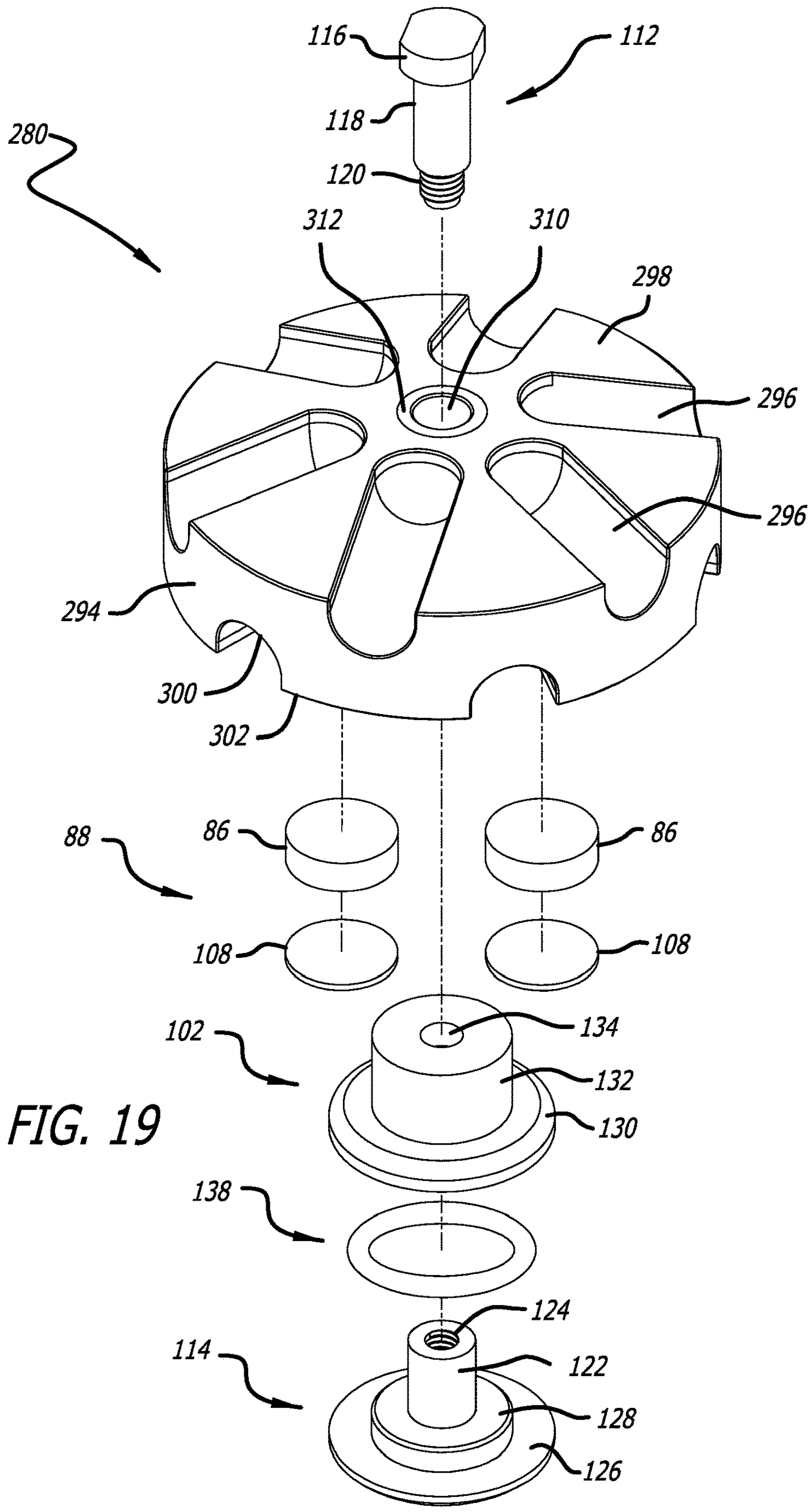
FIG. 19 is an exploded perspective view from above of an exemplary mixer assembly including the second exemplary bearing assembly and two magnets held within a modified puck-shaped mixer.

FIG. 19 is an exploded perspective view from above of an exemplary mixer assembly including the second exemplary bearing assembly 88 and two magnets 86 to be held within a modified puck-shaped mixer 280. The second exemplary bearing assembly 88 is as described above with reference to the bearing assembly 88 (or 144), and like element numbers will thus be used. The assembly includes the upper screw 112 that passes through the bearing member 102 and engages the lower holding nut 114, as explained above. The upper screw 112 includes a head 116, a shaft 118, and a threaded distal end 120. The holding nut 114 has a central vertical column 122 with an internally threaded dead-end bore 124 projecting upward from a stepped base defined by a lower flange 126 and a smaller diameter cylindrical shoulder 128. The bearing member 102 has a wide base flange 130 extending outward at the bottom end of a generally tubular post 132 having a top through hole 134. A process for assembling the mixer 280 and bearing is as described above with reference to FIGS. 13-14.

Figure 20A:
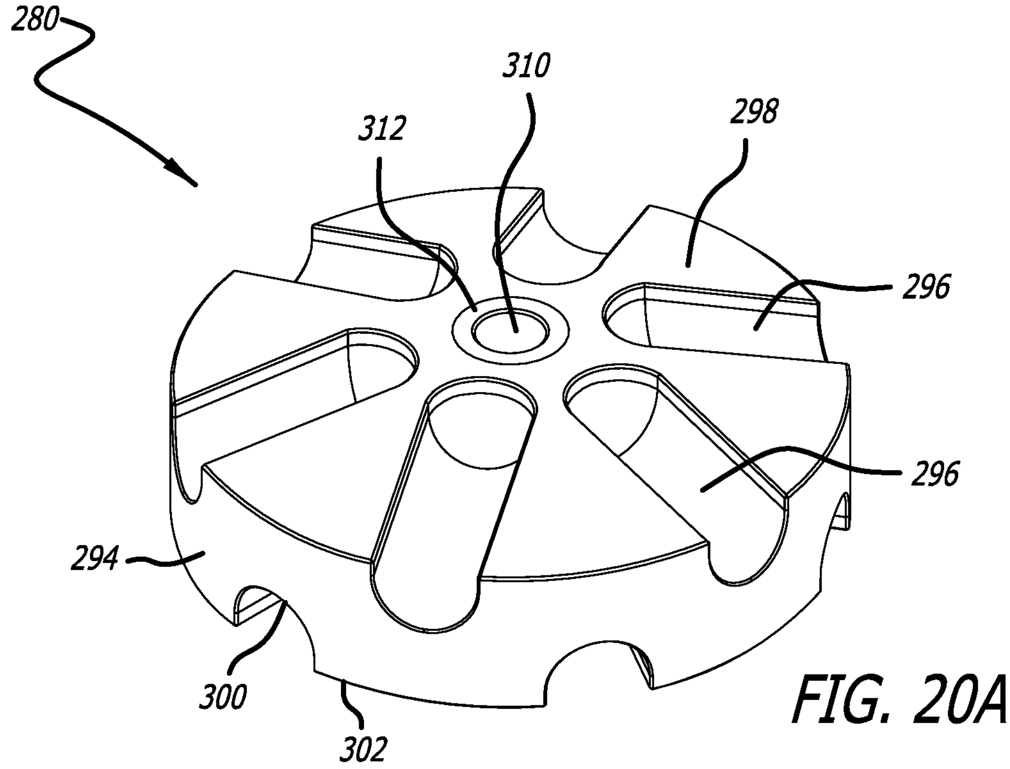
FIG. 20A is a perspective view from above of the modified puck-shaped mixer.
Figure 20B:
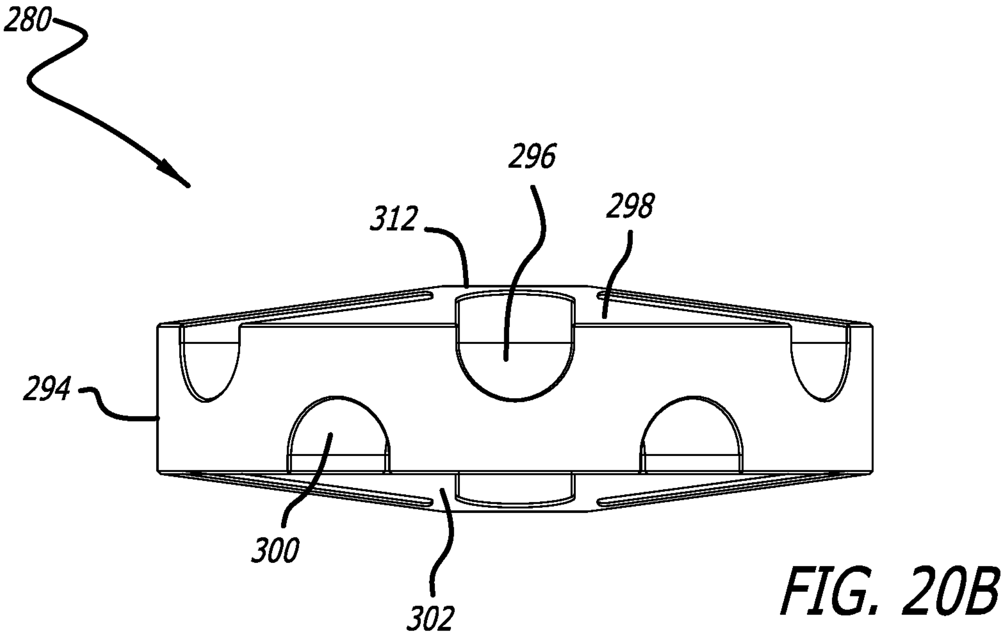
FIG. 20B is a plan view of the puck-shaped mixer.

With reference also to FIGS. 20A and 20B, the mixer 280 comprises a generally cylindrical or puck-shaped body 294 without vanes, but having linear radial grooves on upper and lower surfaces. In particular, the body 294 has a series of radial grooves 296 formed in an upper face 298, and a series of radial grooves 300 formed in a lower face 302. There are desirably six evenly circumferentially spaced grooves 296, 300, though there may be as few as two and as many as twelve, depending on the process requirements. The grooves 296, 300 are generally semi-circular in radial cross-section, and extend along a majority of a radial dimension of the puck-shaped body 294. Each of the grooves 296, 300 opens to a cylindrical outer surface of the body 294, and terminates at a generally spherical radially inner end. The grooves 296, 300 help stir the contents within the bottle 20, and in particular help break up any sediment that collects below the mixer 280.

A central throughbore 310 opens to the top of the body 294 and extends downward through the lower face 302. The throughbore 310 widens and is contiguous with a lower end cavity (not shown) to receive the tubular post 132 of the bearing member 102, as was described. Finally, the mixer 280 defines two dead end cavities (not shown) open to its lower face 302 each of which receives one of the magnets 86 using the end caps 108 or the like.

In contrast with the puck-shaped mixer 180, the mixer 280 has gradually tapered upper and lower faces 300, 302. That is, the faces 300, 302 each has a slight taper from an inner horizontal land 312 to an outer peripheral edge, so that both faces are frustoconical. The angle of taper may vary, but is desirably between about 5-30°. This may help in preventing buildup or caking of material, in particular Aluminum phosphate ($AlPO_4$), between the mixer 280 and the floor of the reactor bottle. Aside from the tapered faces 300, 302, the dimensions of the mixer 280 may be the same as described above for the mixer 180.

As before, the mixer 280 is "microsized" three-dimensional, or generally disk-shaped so as to effectively provide mixing within bottles with relatively small mouth openings 28. The size of the mixer 280 relative to the 3 classes of bottles 28—small, medium, large—is as described above with respect to the 6-vaned mixer 30. The mixer 280 is generally rounded in plan view and has a central axis through which vertical planes of symmetry may be drawn.

Figure 21:
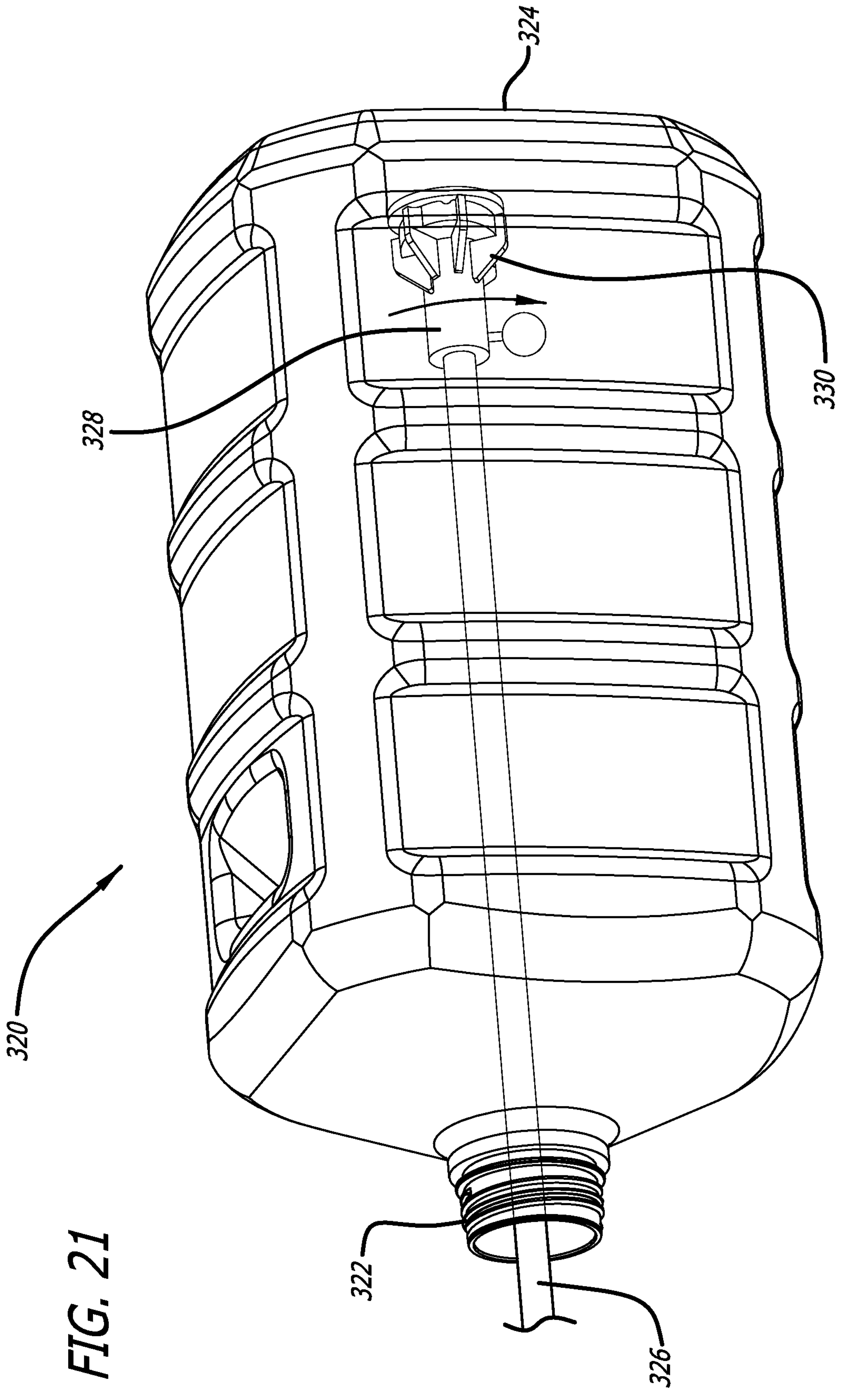
FIG. 21 is a perspective view of an exemplary process bottle showing insertion and coupling of a mixer on the end of a delivery shaft to a bearing assembly on the floor of the bottle.

FIG. 21 is a perspective view of an exemplary process bottle 320 having an open upper mouth 322 opposite a lower bottle floor 324. A delivery shaft 326 having a collar adapter 328 is shown delivering a mixer 330 through the mouth 322 of the bottle 320 to be coupled to a bearing assembly mounted on the floor 324. This assembly technique is enabled by the small sizes of the various mixers disclosed herein which can be inserted through the open mouth 322 intact without any subsequent size conversion or expansion. As explained above, the inner diameter of the upper opening 322 varies for different sizes of bottles, becoming larger for larger bottles. Mouth opening diameters between 48 to 150 mm are common for a range of bottles between 500 ml to 50 liters, and the largest horizontal dimension of each of the mixers described herein is less than that.

Figure 22:
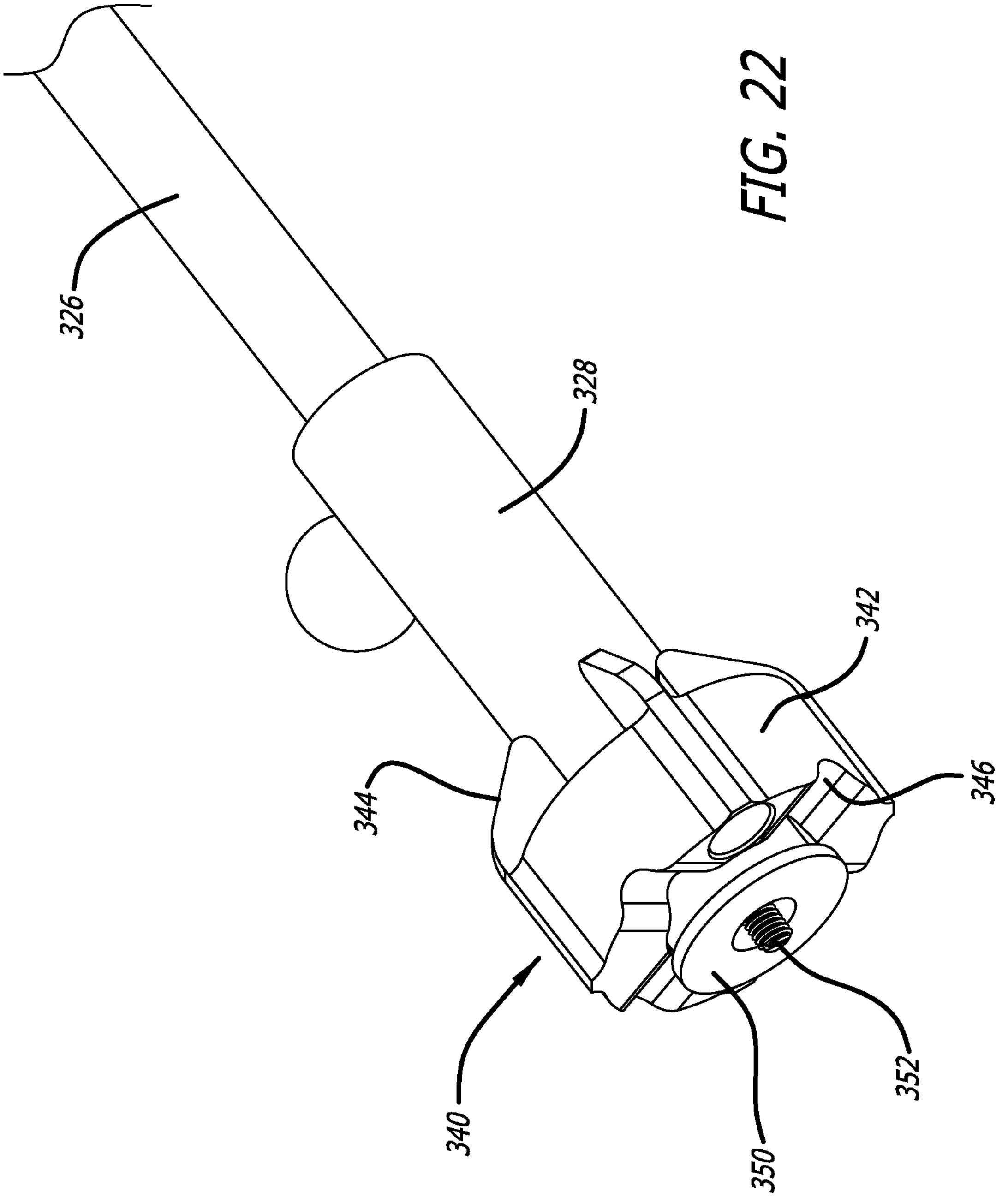
FIG. 22 is a perspective view of the mixer and a portion of the bearing assembly on the end of the delivery shaft from FIG. 21.

FIG. 22 shows a mixer 340 and a portion of the bearing assembly on the end of the delivery shaft 326 from FIG. 21. As with the other vaned mixers described herein, the mixer 340 has a generally cylindrical body 342 with four vanes 344 projecting upward therefrom. A lower surface of the cylindrical body 342 has linear radial grooves 346 which extend inward to a central cavity. A bearing member 350 fits within the central cavity, and a fastening screw 352 projects downward through a bore in the bearing member 350, as has been described. In this embodiment, the mixer 340 is a somewhat larger size and thus the collar adapter 328 is advanced along the shaft 326 to fit closely within vertical surfaces on the four vanes 344. The collar adapter 328 enables conversion of the delivery shaft 326 for different sized mixers, as will be described.

Figure 23A:
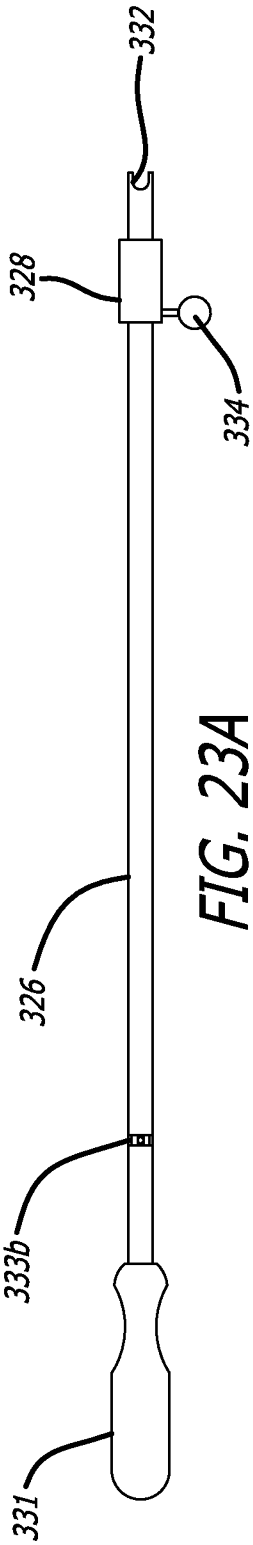
FIG. 23A is an elevational view of the delivery shaft with a collar adapter advanced to a forward position.
Figure 23B:
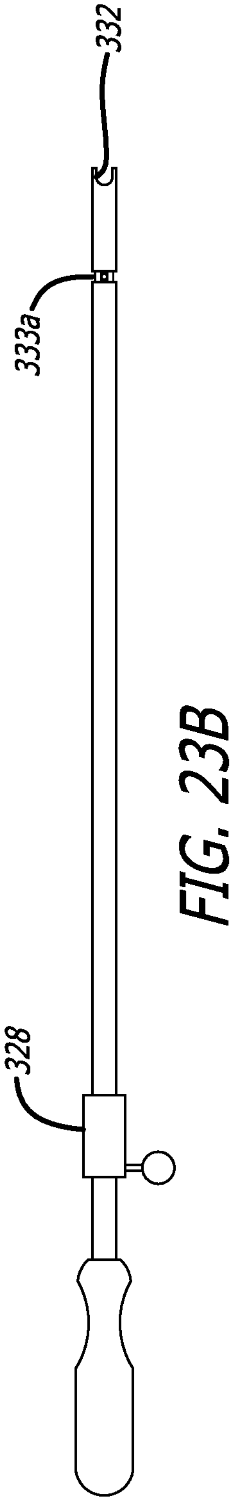
FIG. 23B shows the collar adapter moved to a rearward position.

FIG. 23A is an elevational view of the delivery shaft 326 with the collar adapter 328 advanced to a forward position, and FIG. 23B shows the collar adapter moved to a rearward position. The delivery shaft 326 has a proximal handle 331 opposite a distal bifurcated end 332. A forward circumferential groove 333*a* is machine into the shaft 326, as is a rearward circumferential groove 333*b*. The collar adapter 328 may be slid along the shaft 326 and fixed in either a forward or a rearward position using a spring-loaded pin 334. That is, the pin 334 extends inward into one of the two grooves 333*a*, 333*b* depending on the position desired.

Figure 24:
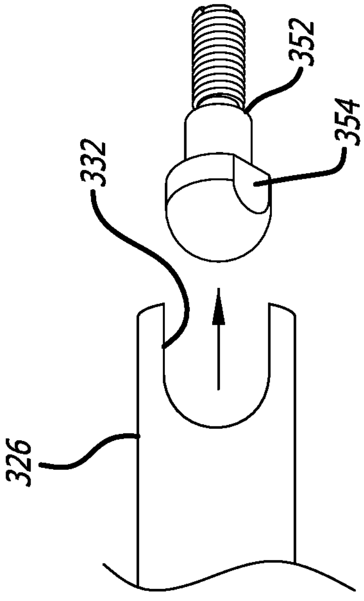
FIG. 24 is an enlarged view of a bifurcated distal end of the delivery shaft adjacent a screw of the bearing assembly.

FIG. 24 is an enlarged view of the bifurcated distal end 332 of the delivery shaft 326 adjacent a screw 352 of the bearing assembly. The screw 352 has a proximal head with a pair of flats 354 on either side. The opposite flats 354 fits closely within the bifurcated distal end 332 which enables rotation of the screw 52 from the handle 331.

Figure 25:
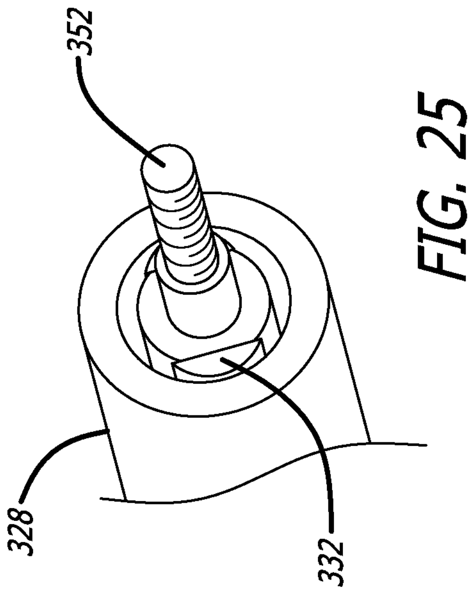
FIG. 25 is a perspective end view of the bifurcated distal end of the delivery shaft around the screw and surrounded by the collar adapter.

FIG. 25 is a perspective end view of the bifurcated distal end 332 of the delivery shaft 326 engaged with the screw 352 and surrounded by the collar adapter 328. This configuration is utilized when delivering and securing larger mixers within the bottles.

Figure 26:
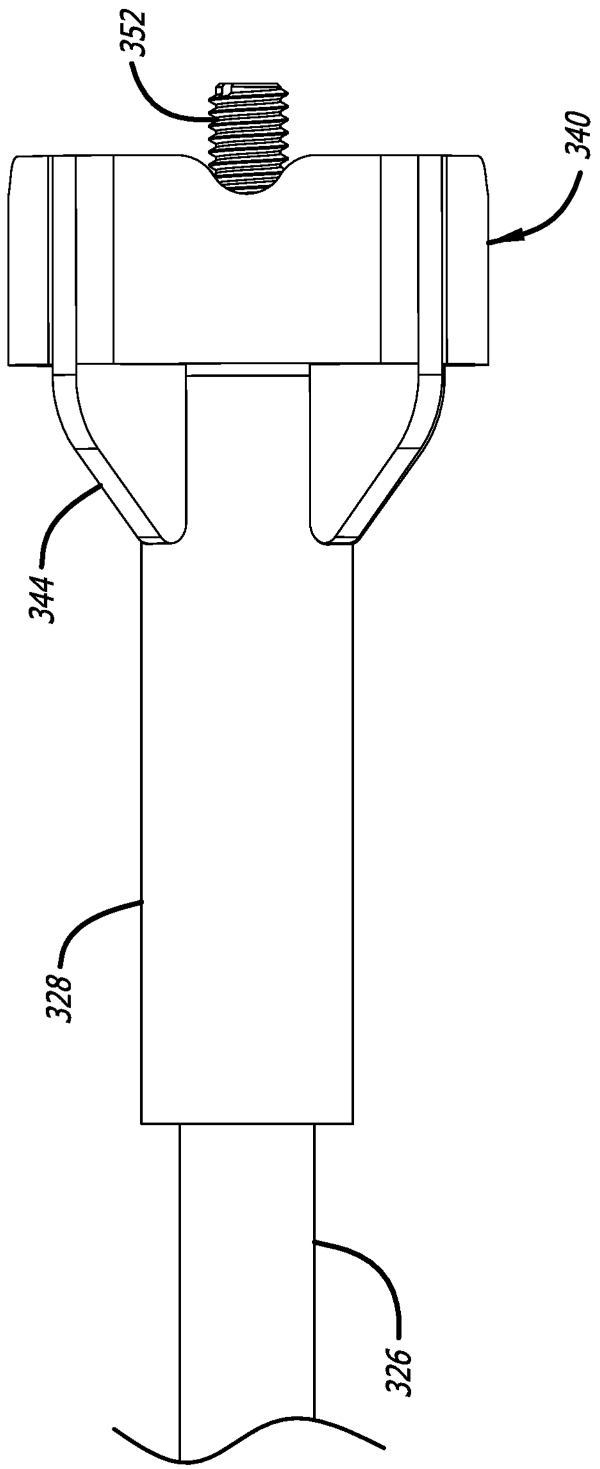
FIG. 26 is an elevational view of a first mixer held on the end of the delivery shaft with the collar adapter in the forward position.

FIG. 26 is an elevational view of the first larger mixer 340 held on the end of the delivery shaft 326 with the collar adapter 328 in the forward position. As explained, the collar 320 has a diameter which fits closely within the longitudinal inner edges of the vanes 344. Preferably, this is an interference fit so that the mixer 340 can be held on the collar adapter 328 during assembly. A distal end of the fastening screw 352 may project beyond the mixer 340.

Figure 27:
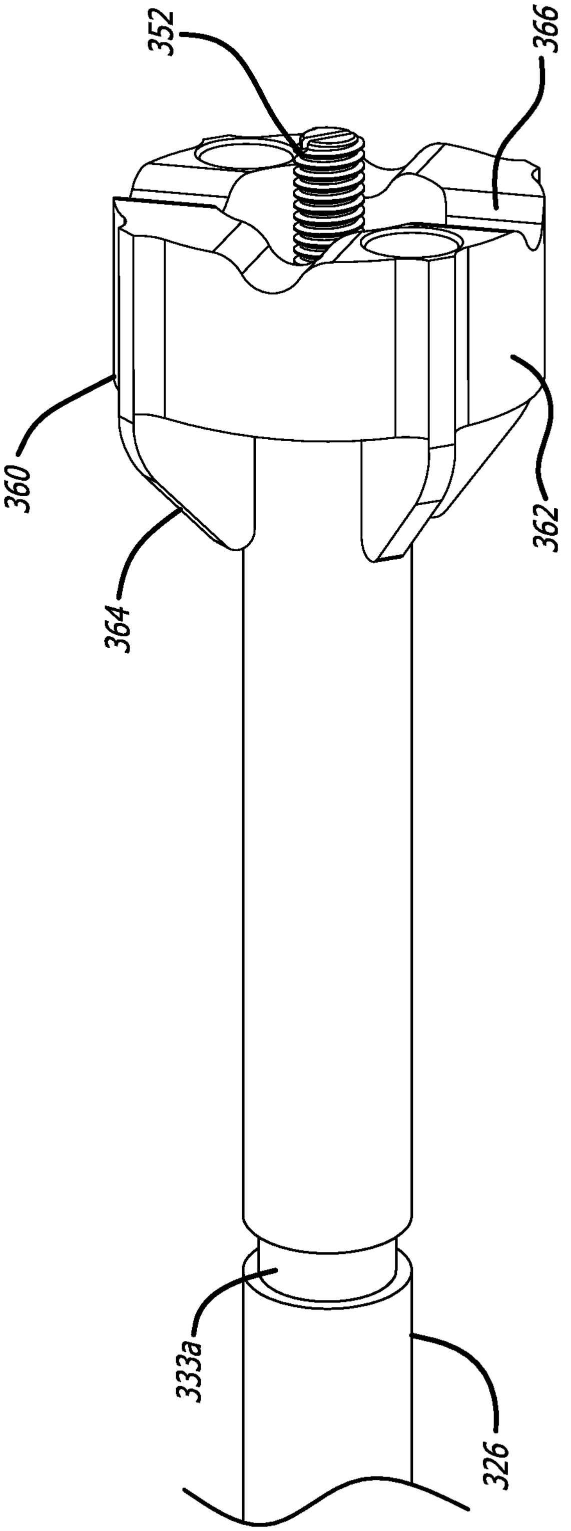
FIG. 27 is a perspective view of a smaller second mixer held on the end of the delivery shaft.

FIG. 27 is an alternative arrangement wherein a smaller second mixer 360 is held directly on the end of the delivery shaft 326. That is, the collar adapter 328 has been disengaged from the forward groove 333*a* and retracted to the rearward groove 333*b*. The smaller second mixer 360 also has a cylindrical body 362, a plurality, preferably four, of upwardly-projecting vertical vanes 364, and a plurality of lower radial grooves 366. The outer diameter of the shaft 326 forms an interference fit within the longitudinal inner edges of the vanes 364. Again, a distal end of the fastening screw 352 may project beyond the mixer 360.

Figure 28A:
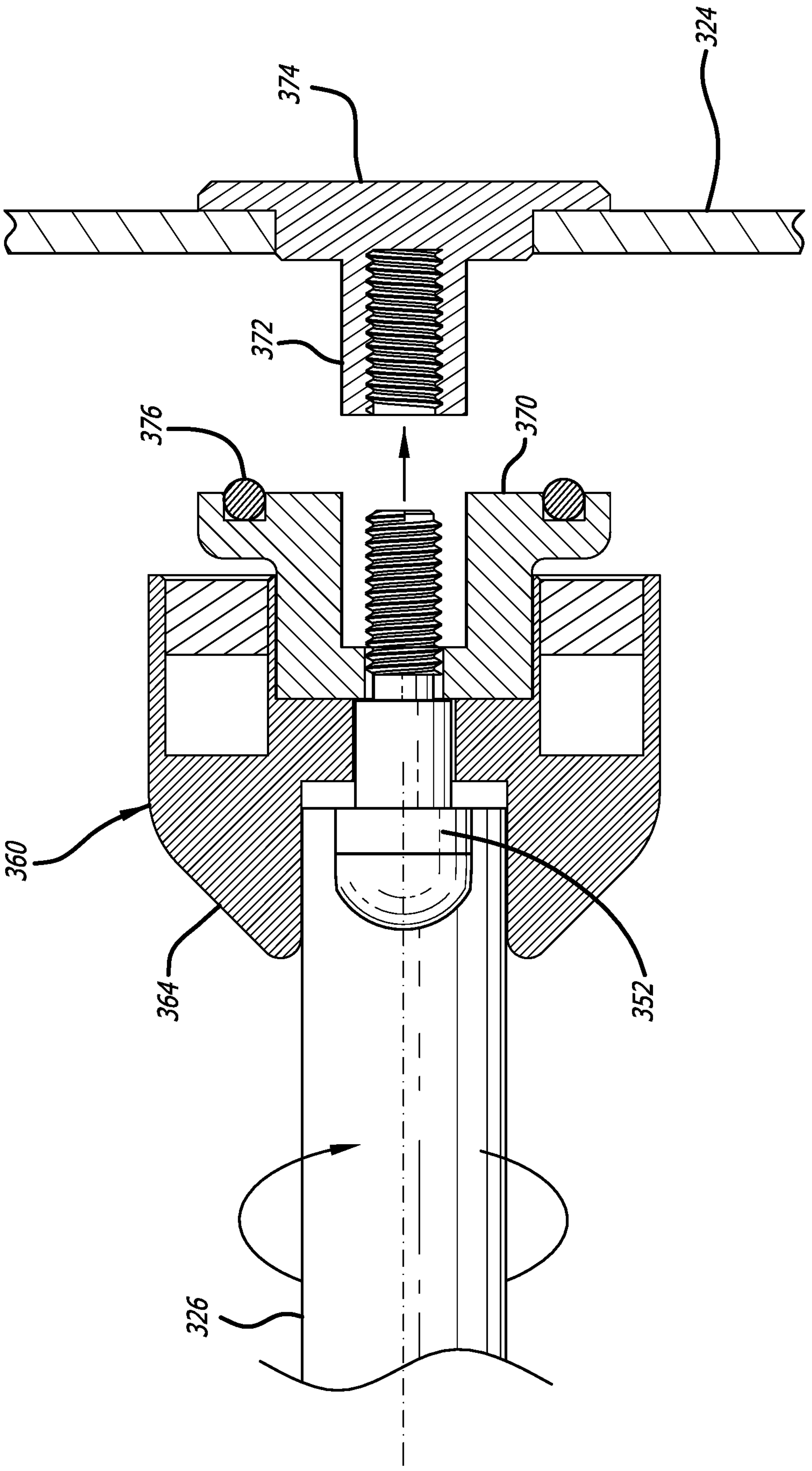
FIG. 28A is a longitudinal sectional view through the second mixer on the end of the delivery shaft along with a portion of the bearing assembly being advanced and coupled with a lower holding nut affixed to the floor of the bottle.

FIG. 28A is a longitudinal sectional view through the second smaller mixer 360 on the end of the delivery shaft 326 being advanced and coupled to a bearing assembly within the bottle. The bearing assembly is similar to those described above, wherein a central cavity within the mixer 360 rotates about a cylindrical bearing member 370. The bearing member 370, in turn, has a central cavity that fits over a central vertical column 372 of a holding nut 374 affixed to the bottle floor 324. The fastening screw 352 threads into the inner bore of the vertical column 372. The ability to first seal the holding nut 374 to the bottle floor 324 and then advance the mixer 360 and remaining bearing parts 352, 370 on the shaft 326 greatly facilitates assembly.

Figure 28B:
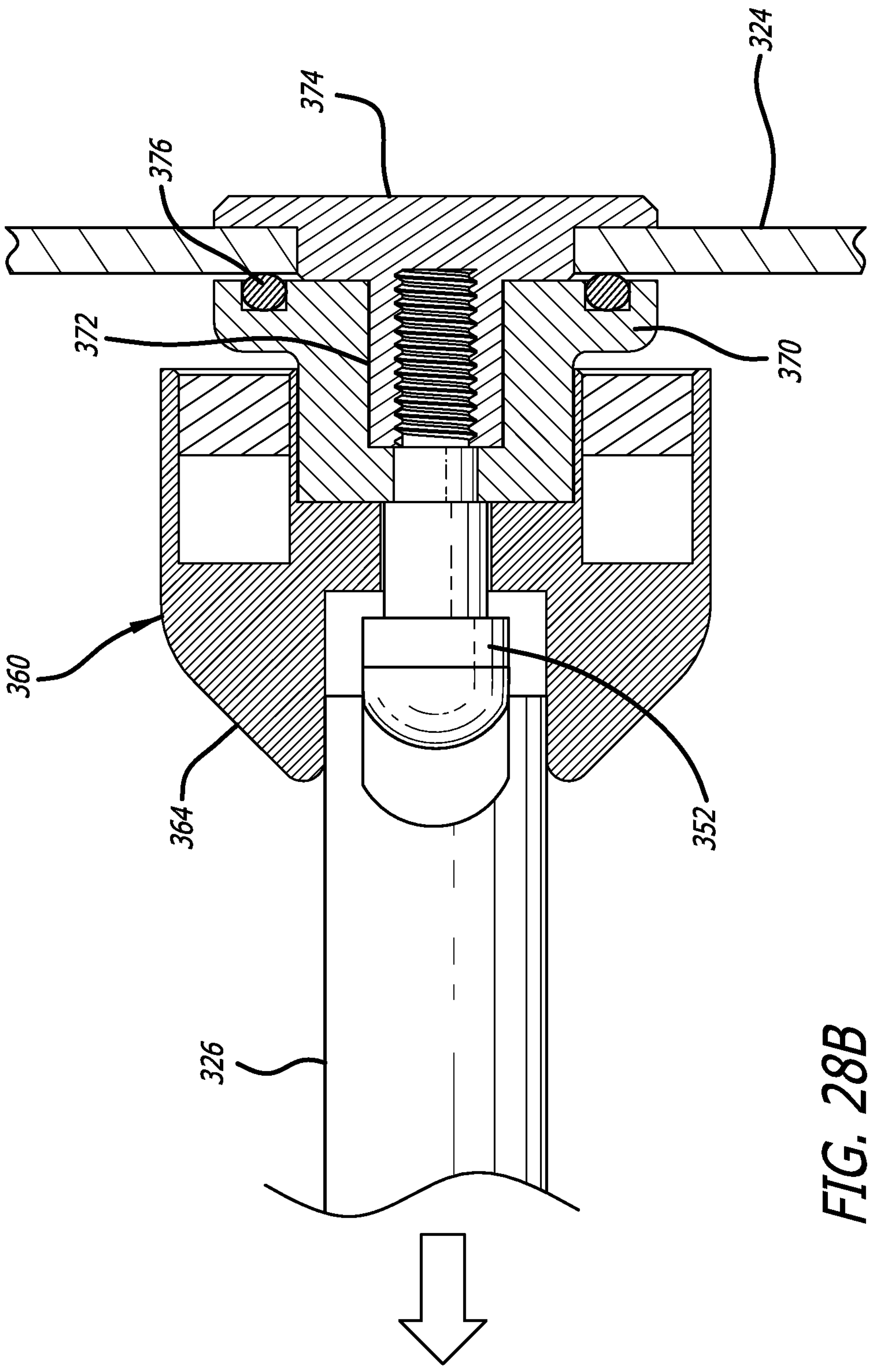
FIG. 28B shows the second mixer having been mounted to the floor of the bottle.

FIG. 28B shows the second mixer 360 having been mounted to the floor 324 of the bottle with the screw 352 tight within the threaded bore of the vertical column 372. Again, a small gap remains between the head of the screw 352 and the mixer 360 to enable free rotation of the latter. The O-ring 376 under the outer flange of the bearing member 370 is firmly sealed against the floor 324, and the shaft 326 can then be removed from within the bottle as shown.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

It is claimed:

1. An aseptic mixing system, comprising:

an aseptic process bottle having a bottom with a floor, vertical sidewalls and a top wall extending inward from the sidewalls to an upper mouth defining an upper opening with an upper mouth diameter, the process bottle having a center extending from the upper mouth to the bottom;

a shaft having an upper end and a lower end, the shaft disposed in the center of the bottle;

a solid mixer held onto the lower end of the shaft and positioned for rotation about a central axis at the bottom of the process bottle, the mixer being generally circular in plan view and having a generally cylindrical disk-shaped body in which is mounted at least one magnet to enable coupling with a magnetic-drive exterior to the process bottle, the mixer having an overall outer diameter that is less than the upper mouth diameter of the process bottle; and a bearing assembly mounted inside the process bottle configured to support the mixer for rotation about the central axis.

2. The aseptic mixing system of claim 1, wherein the mixer has a plurality of circumferentially-spaced vanes upstanding from the disk-shaped body.

3. The aseptic mixing system of claim 2, wherein the vanes extend radially outward from the disk-shaped body.

4. The aseptic mixing system of claim 2, wherein there are four of the vanes.

5. The aseptic mixing system of claim 1, wherein there are a plurality of lower grooves formed in a lower face of the disk-shaped body.

6. The aseptic mixing system of claim 5, wherein there are four of the lower grooves evenly circumferentially-spaced about the central axis, and four vanes upstanding from the disk-shaped body, and the four lower grooves are offset circumferentially from the four vanes.

7. The aseptic mixing system of claim 1, wherein the mixer has no vanes upstanding from the disk-shaped body so as to be puck-shaped.

8. The aseptic mixing system of claim 7, wherein there are plural lower grooves formed in a lower face of the disk-shaped body.

9. The aseptic mixing system of claim 8, wherein the mixer also has a plurality of upper grooves formed in an upper face of the disk-shaped body, and the upper and lower grooves are radially-extending and evenly circumferentially-spaced about the central axis on each face, and the lower grooves are offset circumferentially from the upper grooves.

10. The aseptic mixing system of claim 8, wherein there are six of the lower grooves evenly circumferentially-spaced about the central axis.

11. The aseptic mixing system of claim 10, wherein the six lower grooves are offset circumferentially from six of the upper grooves evenly circumferentially-spaced about the central axis.

12. The aseptic mixing system of claim 7, wherein the mixer has gradually tapered upper and lower faces so that both faces are frustoconical.

13. The aseptic mixing system of claim 1, wherein there are a plurality of lower grooves formed in a lower face of the disk-shaped body, and the grooves are linear and extend radially.

14. The aseptic mixing system of claim 13, wherein the grooves are generally semi-circular in radial cross-section.

15. The aseptic mixing system of claim 1, wherein the bearing assembly includes a bearing member sealed on the floor of the process bottle around a hole, and which defines a central through hole.

16. The aseptic mixing system of claim 15, wherein the bearing assembly includes a lower holding nut having an upstanding internally-threaded vertical column sized to pass through the central through hole, the holding nut having a lower flange adhered to an underside of the floor of the process bottle, the bearing assembly further having a screw sized to pass down through a central throughbore in the disk-shaped body and engage the internally-threaded vertical column to secure the mixer above the floor while permitting rotation thereof.

17. The aseptic mixing system of claim 16, wherein the bearing member has a base flange that defines a downwardly-facing groove, and the bearing assembly includes an O-ring positioned in the groove that seals against the floor of the process bottle around the hole.

18. The aseptic mixing system of claim 15, wherein the central through hole of the bearing member is internally threaded on both ends, and a lower screw projects upward through the hole in the center of the floor and into the threaded bore to secure the bearing member to the floor, and the bearing assembly includes an O-ring sealed against the floor of the process bottle around the hole by the bearing member.

19. The aseptic mixing system of claim 13, wherein there are two magnets mounted within the disk-shaped body to enable coupling with a magnetic-drive exterior to the process bottle, and the magnets are positioned within two diametrically-opposed cavities open to an underside of the disk-shaped body.

20. The aseptic mixing system of claim 19, wherein the two diametrically-opposed cavities are offset from the lower grooves.

21. An aseptic mixing system comprising:

an aseptic process bottle having a bottom with a floor, vertical sidewalls and a top wall extending inward from the sidewalls to an upper mouth defining an upper opening with an upper mouth diameter;

a mixer positioned for rotation about a central axis of the mixer and disposed at the bottom of the process bottle, the mixer being generally circular in plan view and having a generally cylindrical disk-shaped body in which is mounted at least one magnet to enable coupling with a magnetic-drive exterior to the process bottle, the mixer having an overall outer diameter that is less than the upper mouth diameter of the process bottle, the mixer having a plurality of vanes which extend vertically upward into the bottle and radially outward of the disk-shaped body, the vanes adapted to reduce fluid shear and to gently mix fluid within the bottle; and a bearing assembly configured to support the mixer for rotation about the central axis, further comprising a shaft connected to and extending upward from the mixer and above the bottom of the bottle, wherein the shaft suspends the mixer.

22. The aseptic mixing system of claim 21 wherein there are four of the vanes.

23. The aseptic mixing system of claim 21 wherein the bearing assembly includes a bearing member sealed on the floor of the process bottle.

24. The aseptic mixing system of claim 23 wherein the bearing assembly is disposed around a hole in the floor of the process bottle.

25. The aseptic mixing system of claim 21 wherein the bearing assembly is mounted through a hole in a floor of the process vessel configured to support the mixer for rotation about the central axis, and wherein the bearing assembly includes a bearing member adapted to seal on the floor of the process vessel around the hole.

26. The aseptic mixing system of claim 21 wherein there are four of the vanes.

* * * * *